United States Patent [19]
Sahashi et al.

[11] Patent Number: 5,322,320
[45] Date of Patent: Jun. 21, 1994

[54] SHOCK ABSORBER DAMPING FORCE CONTROL SYSTEM FOR VEHICLE

[75] Inventors: Toshiyasu Sahashi, Kariya; Hiroshi Ishikawa, Nagoya; Masayoshi Takeda; Takahiro Kiso, both of Oobu; Takayuki Nagai, Nagoya; Tadaki Nakayama, Chiryu, all of Japan

[73] Assignee: Nippondenso Co., Ltd., Kariya, Japan

[21] Appl. No.: 2,843

[22] Filed: Jan. 14, 1993

[30] Foreign Application Priority Data

Jan. 14, 1992 [JP] Japan .................... 4-5077
Jan. 28, 1992 [JP] Japan .................... 4-13360
Sep. 16, 1992 [JP] Japan .................... 4-246929

[51] Int. Cl.$^5$ ............................ B60G 17/08
[52] U.S. Cl. .................. 280/707; 364/424.05
[58] Field of Search ............ 280/707; 364/424.05

[56] References Cited

U.S. PATENT DOCUMENTS

| | | | |
|---|---|---|---|
| 4,696,489 | 9/1987 | Fujishiro et al. | 280/707 |
| 4,936,604 | 6/1990 | Kawagoe et al. | 280/707 X |
| 5,071,159 | 12/1991 | Kamimura et al. | 280/707 |
| 5,075,855 | 12/1991 | Sugasawa et al. | 280/707 X |

FOREIGN PATENT DOCUMENTS 60-183216 9/1985 Japan .
3104726 5/1991 Japan .
3227711 10/1991 Japan .

*Primary Examiner*—Margaret A. Focarino
*Assistant Examiner*—Peter English
*Attorney, Agent, or Firm*—Cushman, Darby & Cushman

[57] ABSTRACT

A shock absorber damping force control system for a vehicle employs at least a high-frequency component included in sprung mass vibration as a factor to control a damping force of a shock absorber. The system provides a lower damping force of the shock absorber with a larger magnitude of the high-frequency component when signs of a sprung mass velocity and a relative velocity between a sprung mass and an unsprung mass coincide with each other. A low-frequency component may also be employed as a factor to control the damping force of the shock absorber. The system provides a lower damping force with a larger ratio of the high-frequency component relative to the low-frequency component when signs of the sprung mass velocity and the relative velocity coincide with each other.

21 Claims, 22 Drawing Sheets

SHOCK ABSORBER DAMPING FORCE CONTROL SYSTEM FOR VEHICLE

BACKGROUND OF THE INVENTION

1. Field of the Invention

The present invention relates to a shock absorber damping force control system for a vehicle.

2. Description of the Prior Art

Various damping force control systems for automotive shock absorbers are known as disclosed in Japanese First (unexamined) Patent Publication No. 3-104726. In that publication, the system judges a direction of a required damping force to be produced based on comparison between signs of a monitored sprung mass velocity and a monitored relative velocity between the sprung mass and an unsprung mass, and further judges a stroke direction of the shock absorber based on the sign of the relative velocity. The system varies the damping force based on these decisions so as to provide both driving stability and riding comfort. This system utilizes the theory known in this field of endeavor as "skyhook". According to this system, however, since damping or suppressing low-frequency vibration of the sprung mass is preferentially dealt with, high-frequency vibration is increased when the vehicle travels on an unlevel or untreated road surface, resulting in (1) the of vehicular passengers having a feeling like they are running on a hard rugged road surface; (2) poor treading of the tire on the ground. Furthermore, when passing over an obstacle on the road surface, the vehicular passenger's feeling of running on a hard rugged road surface is increased.

In order to improve the problems, with the system of the type disclosed in Japanese First (unexamined) Patent Publication No. 3-227711, as noted above, a signal from sprung mass acceleration detecting means is Fourier-converted to derive power spectrum data for deriving the respective sums of the power spectra across the resonance points of the sprung and unsprung masses. Based on the derived sums, a hardness value of the damping force is corrected so as to improve the suppression of the sprung mass vibration, the riding comfort and the treading of the tire on the ground.

Japanese First (unexamined) Patent Publication No. 60-183216 discloses another type of the shock absorber damping force control system. In that system, in order to reduce a shock generated when the vehicle passes over an obstacle on the road surface, a damping force for rear wheels is maintained low from when front wheels sense the shock, and is returned to the original value after the rear wheels pass over the obstacle.

In the aforementioned publications, however, sufficient consideration has not been given as to how a vehicular passenger feels when vibration is caused by both the sprung mass resonance point and the unsprung mass resonance point. The sprung mass resonance point causes the vehicular passenger to have a wavering feeling due to a low-frequency vibration of the sprung mass (hereinafter also referred to as "on-wave feeling", "on-wave behavior", "on-wave vibration" or "on-wave component") The unsprung mass resonance point causes the vehicular passenger to have a feeling of running on a hard rugged road surface due to a high-frequency vibration of the sprung mass (hereinafter also referred to as "on-ruggedness feeling", "on-ruggedness behavior", "on-ruggedness vibration" or "on-ruggedness component"). Nor do the aforementioned publications discuss how to control the damping force under the condition that both resonance points are input so as to provide a better feeling to the vehicular passenger, and how a vehicle's speed affects the feeling of the vehicular passenger, resulting in poor improvement of the riding comfort.

On the other hand, in the second aforementioned publication, although the system works well when the obstacles in the road are independently arranged at constant intervals, such as on the high level roads, it does not work well when obstacles exist on a largely waving road. Specifically, under this condition, keeping the damping force at a low level causes vehicle body vibrational behavior to increase, which should be avoided. Further, when the obstacles exist on an unlevel road surface in a continuous manner at intervals shorter than a vehicular wheel base, the damping force is kept low which deteriorates the treading of the tire on the ground and the driving stability of the vehicle.

SUMMARY OF THE INVENTION

Therefore, it is an object of the present invention to provide an improved shock absorber damping force control system for a vehicle that can eliminate the defects noted above which are inherent in the prior art.

To accomplish the aforementioned objective and other objectives, according to one aspect of the present invention, a damping force control system for a shock absorber for use in a vehicle comprises an actuator for varying a damping force of the shock absorber provided between a sprung mass and an unsprung mass; first means for deriving a sprung mass velocity and producing a first signal indicative of the derived sprung mass velocity; second means for deriving a relative velocity between the sprung mass and the unsprung mass and producing a second signal indicative of the derived relative velocity; third means for extracting at least a high-frequency component within a predetermined frequency band from at least one of sprung mass vertical vibration and relative vibration between the sprung mass and the unsprung mass and producing a third signal indicative of the extracted high-frequency component; and fourth means, responsive to said first, second and third signals, for controlling an operation of said actuator to provide a lower damping force of the shock absorber when signs of said sprung mass velocity and said relative velocity disagree with each other and a higher damping force of the shock absorber when said signs coincide with each other, said fourth means reducing a degree of said higher damping force with a larger magnitude of said high-frequency component when said signs coincide with each other.

BRIEF DESCRIPTION OF THE DRAWINGS

The present invention will be understood more fully from the detailed description given below and from the accompanying drawings of the preferred embodiments of the invention, which are given by way of example only, and are not intended to limit the scope of the present invention.

In the drawings.

DESCRIPTION OF THE PREFERRED EMBODIMENT

Figure 1:
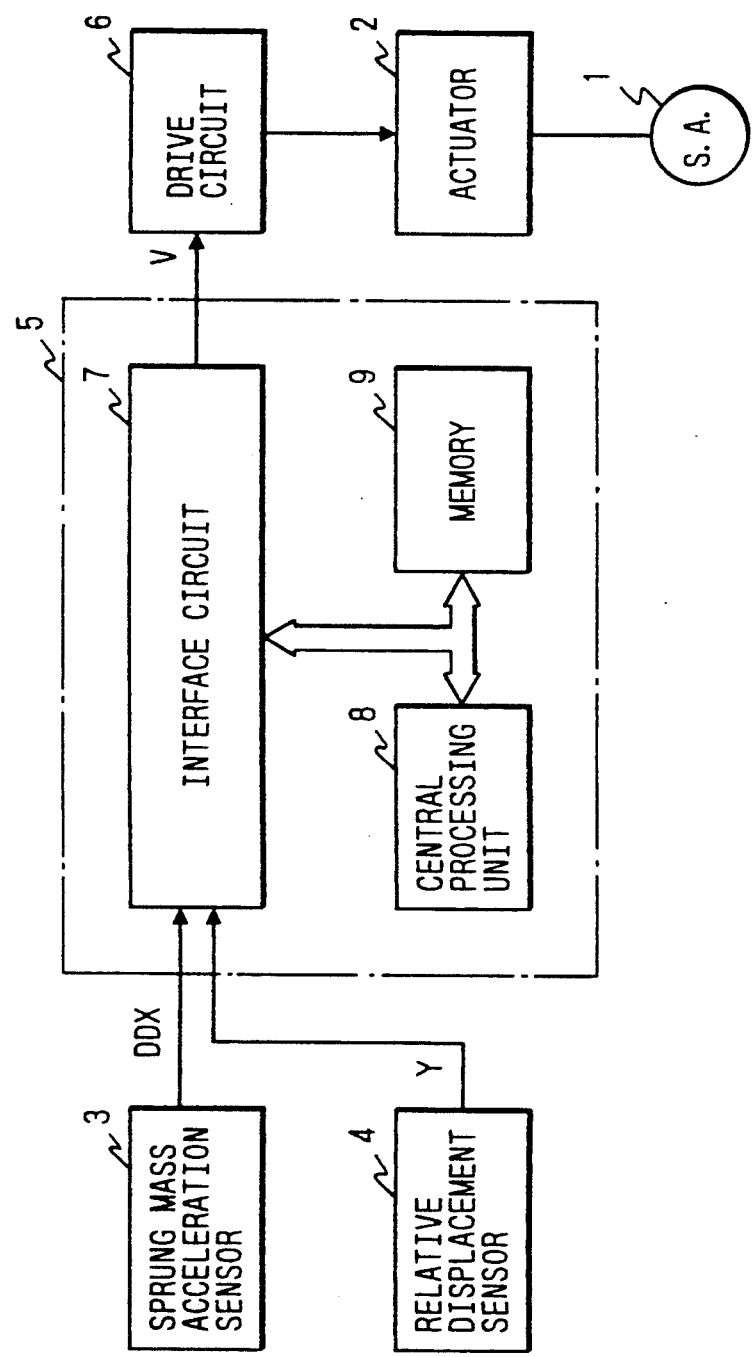
FIG. 1 is a schematic block diagram showing an overall structure of a shock absorber damping force control system for a vehicle.

Referring now to the drawings, a first preferred embodiment of the present invention will be described with reference to FIGS. 1 to 7.

FIG. 1 is a schematic diagram showing an overall structure of a shock absorber damping force control system for an automotive vehicle.

A damping force variable shock absorber (S.A.) 1 is provided at each of four wheels of the vehicle. A damping force of each shock absorber 1 is adjusted by a corresponding actuator 2.

A sprung mass acceleration sensor 3 is mounted to a sprung mass, i.e. a vehicle body at a location corresponding to each of the four wheels and monitors a vertical acceleration DDX of the sprung mass. A relative displacement sensor 4 is provided between the sprung mass and an unsprung mass, i.e. each of the four wheels or each wheel assembly and monitors a relative displacement Y between the sprung mass and the unsprung mass. FIG. 1 shows only one of the four shock absorbers 1, of the four actuators 2, of the four sprung mass acceleration sensors 3 and of the four relative displacement sensors 4.

The sprung mass acceleration sensor 3 and the relative displacement sensor 4 are connected to a controller 5 which, in turn, is connected to a drive circuit 6. The actuator 2 is driven through the drive circuit 6 to adjust or vary the damping force of the shock absorber 1. The controller 5 comprises a microcomputer having an interface circuit 7, a central processing unit 8 and a memory 9 which stores programs to be executed by the central processing unit 8 and stores in sequence results of the execution of the programs into memory areas thereof. The interface circuit 7 is supplied with signals indicative of the monitored sprung mass acceleration and the monitored relative displacement, respectively, from the sprung mass acceleration sensor 3 and the relative displacement sensor 4 and outputs a control signal V to the drive circuit 6.

Figure 2:
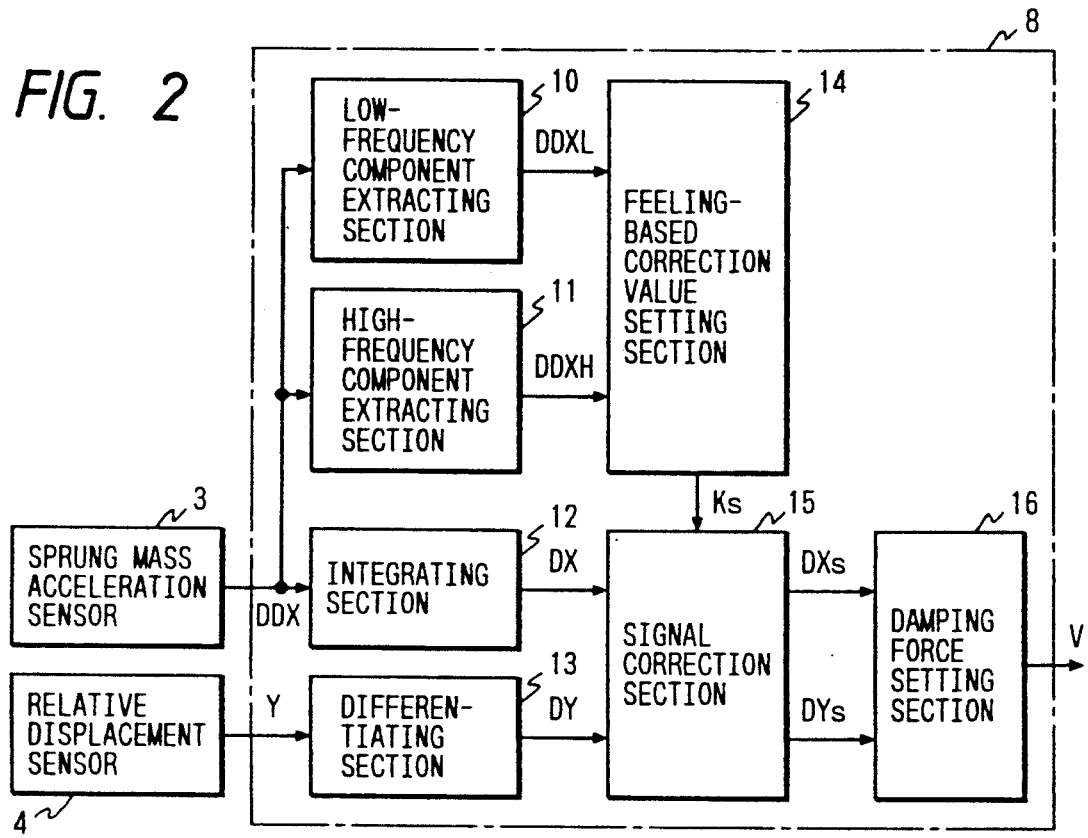
FIG. 2 is a functional block diagram of a central processing unit according to a first preferred embodiment of the present invention.

FIG. 2 shows the central processing unit 8 in the form of functional blocks. The central processing unit 8 comprises an on-wave component extracting section 10, an on-ruggedness component extracting section 11, an integrating section 12, a differentiating section 13, a sensuousness or feeling-based correction value setting section 14, a signal correction section 15 and a damping force setting section 16. The integrating section 12 integrates the sprung mass acceleration DDX monitored by the sprung mass acceleration sensor 3 to derive a sprung mass absolute velocity DX. The word "absolute" is used in comparison with the word "relative" and not in the sense of "absolute value". The differentiating section 13 differentiates the relative displacement Y monitored by the relative displacement sensor 4 to derive a relative speed DY between the sprung mass and the unsprung mass. It is determined hereby that the absolute velocity DX in the upward or rising direction is represented by a positive sign (+) and that in the downward or falling direction is represented by a negative sign (−), and that the relative velocity DY in the expansion direction is represented by a positive sign (+) and that in the compression direction is represented by a negative sign (−).

Figure 3:
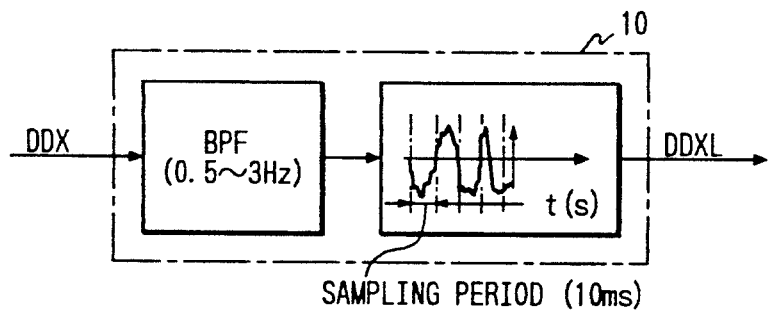
FIG. 3 is a functional diagram of a low-frequency component extracting section in FIG. 2.

As shown in FIG. 3, the on-wave component extracting section 10 extracts frequency components within a band of 0.5 to 3 Hz from the sprung mass acceleration indicative signal DDX fed from the sprung mass acceleration sensor 3, using a band-pass filter BPF. The on-wave component extracting section 10 then executes sampling of peak values at predetermined sampling periods (for example, 10 ms for each sampling period) with respect to the extracted frequency component indicative signal and averages absolute values of the sampled peak values of the preceding X times (X is a given integral number) to output the averaged value as a value DDXL at that instant.

Figure 4:
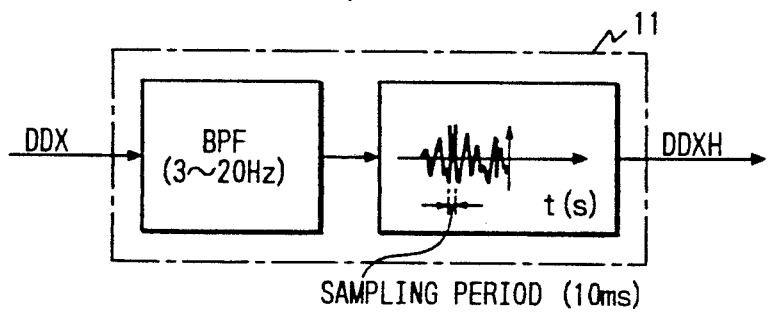
FIG. 4 is a functional diagram of a high-frequency component extracting section in FIG. 2.

As shown in FIG. 4, the on-ruggedness component extracting section 11 extracts frequency components within a band of 3 to 20 Hz from the sprung mass acceleration indicative signal DDX fed from the sprung mass acceleration sensor 3, using a band-pass filter BPF. The on-ruggedness component extracting section 11 then executes sampling of peak values at predetermined sampling periods (for example, 10 ms for each sampling period) with respect to the extracted frequency component indicative signal and averages absolute values of the sampled peak values of the preceding Y times (Y is a given integral number) to output the averaged value as a value DDXH at that instant.

Instead of using the sampled peak values of the preceding X or Y times, only the positive or negative sampled peak values may be used. Further, instead of using the sampled peak values of the preceding X or Y times, the sampled peak values in the given preceding Z seconds may be used. Still further, instead of using the averaged value as the output value, one of preset values may be used as the output value. Specifically, the above-noted absolute values are compared with the preset values, and one of the preset values which is smaller than all of the absolute values but the largest among the preset values which are smaller than all of the absolute values, may be used as the output value.

The feeling-based correction value setting section 14 receives the low-frequency component indicative signal DDXL from the on-wave component extracting section 10 and the high-frequency component indicative signal DDXH from the on-ruggedness component extracting section 11. The feeling-based correction value setting section 14 derives and outputs a correction value or coefficient Ks based on a prestored feeling-based map of FIG. 5. The correction value Ks is used in the signal correction section 15 for correcting the sprung mass velocity DX and/or the relative velocity DY to derive corrected values DXs and DYs supplied to the damping force setting section 16.

Figure 5:
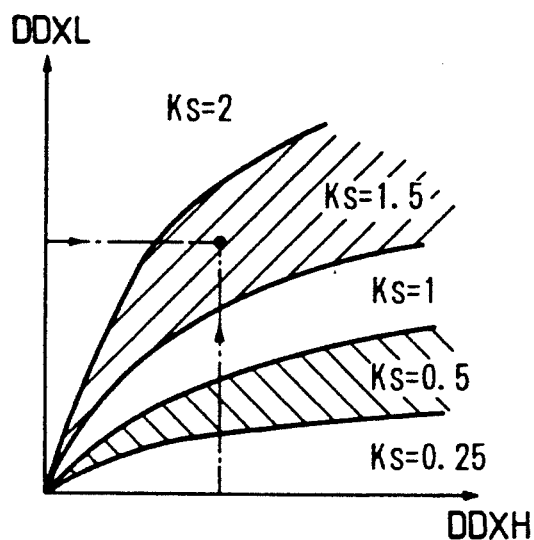
FIG. 5 is a map for deriving a correction value.

In the feeling based map of FIG. 5, an axis of abscissas is defined in terms of the high-frequency component DDXH and an axis of ordinate is defined in terms of the low-frequency component DDXL. The feeling based map includes areas defined for determining the correction value Ks depending on the predicted feeling of the human being in terms of magnitudes of the high-frequency component DDXH and the low-frequency component DDXL. The correction value Ks is an index representative of a ratio between the on-ruggedness feeling caused by the on-ruggedness behavior or vibration of the vehicle body and the on-wave feeling caused by the on-wave behavior or vibration of the vehicle body, which the human being senses. The feeling based map of FIG. 5 is prepared through various experiments which were performed by the human being actually riding on the automotive vehicle.

The signal correction section 15 receives the correction value Ks from the feeling based correction value setting section 14, the sprung mass absolute velocity DX from the integrating section 12 and the relative velocity DY between the sprung and unsprung masses from the differentiating section 13 and derives a sprung mass absolute velocity corrected signal DXs and a relative velocity corrected signal DYs in the following manner:

DXs←Ks·DX  DYs←DY

The corrected signals DXs and DYs are output from the signal correction section 15 into the damping force setting section 16.

Figure 6:
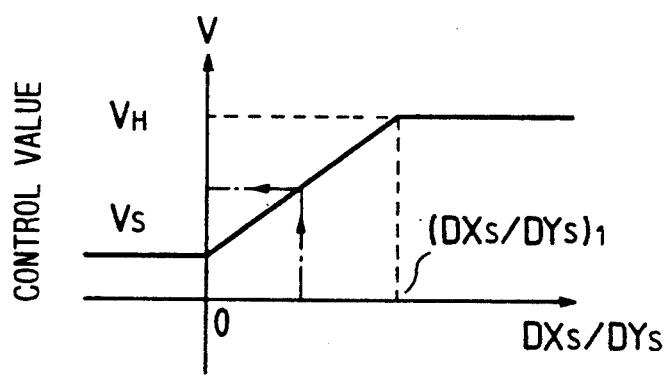
FIG. 6 is a map for deriving a damping force control value.

The damping force setting section 16 derives a control value V for the drive circuit 6 in terms of the corrected signals DXs and DYs by using a map of FIG. 6. In the map of FIG. 6, an axis of abscissas is defined in terms of the quotient (DXs/DYs) of the sprung mass absolute velocity corrected signal DXs and the relative velocity corrected signal DYs and an axis of ordinate is defined in terms of the control value V. Specifically, in the map of FIG. 6, when the quotient (DXs/DYs) is less than 0 (zero), the control value V is set to a minimum value Vs, when the quotient (DXs/DYs) is from 0 to a preselected quotient (DXs/DYs)$_1$, the control value V is linearly increased from the minimum value Vs to a maximum value $V_H$, and when the quotient (DXs/DYs) is larger than the preselected quotient (DXs/DYs)$_1$, the control value V is set to the maximum value $V_H$.

Figure 7:
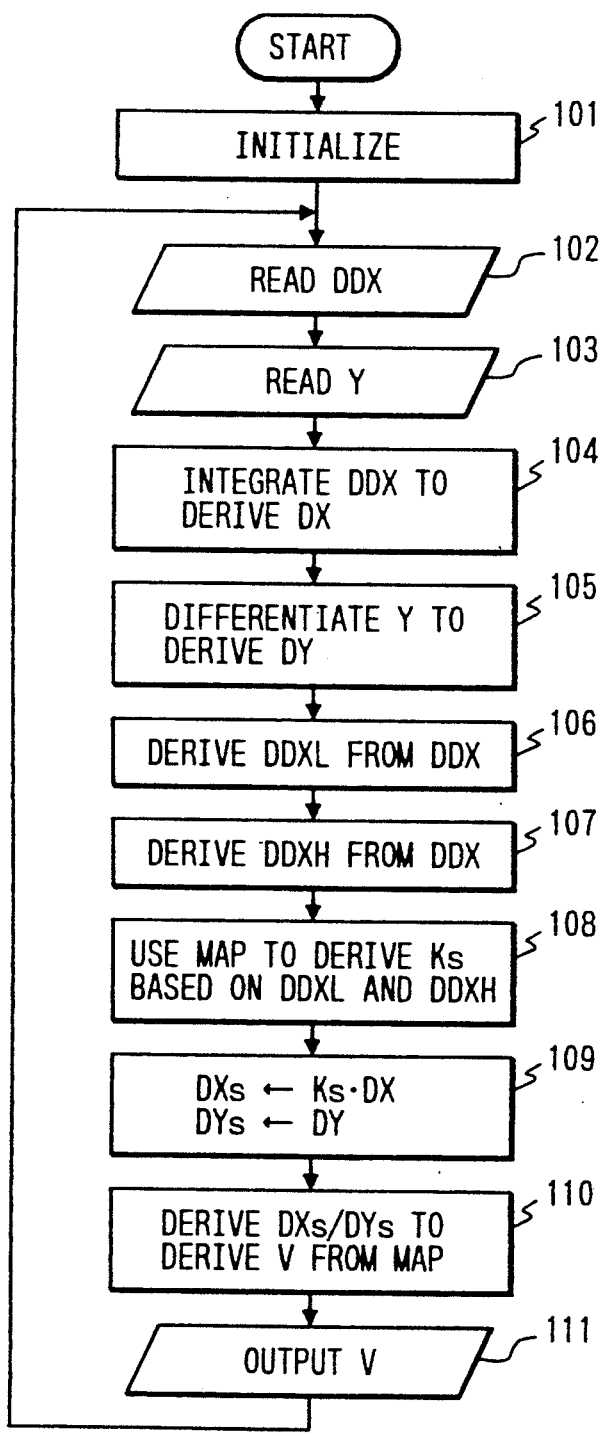
FIG. 7 is a flowchart to be executed by the central processing unit in FIG. 2 for deriving the damping force control value.

Now, the operation of the first preferred embodiment will be described with reference to a flowchart of FIG. 7 which is executed by the central processing unit 8.

At a first step 101, the routine performs initialization. Subsequently, the sprung mass acceleration indicative signal DDX is read out at a step 102 and the relative displacement indicative signal Y is read out at a step 103. At a step 104, the sprung mass acceleration indicative signal DDX is integrated to derive the sprung mass velocity indicative signal DX. At a subsequent step 105, the relative displacement indicative signal Y is differentiated to derive the relative velocity indicative signal DY.

At a step 106, the low-frequency component DDXL indicative of the on-wave component is extracted from the sprung mass acceleration indicative signal DDX. Similarly, at a step 107, the high-frequency component DDXH indicative of the on-ruggedness component is extracted from the sprung mass acceleration indicative signal DDX.

Now, the routine proceeds to a step 108 where the correction value Ks is derived in terms of the low-frequency component DDXL and the high-frequency component DDXH by using the prestored feeling based map of FIG. 5 which was prepared considering the human being's sensuousness. Specifically, the step 108 judges depending on magnitudes of the low-frequency component DDXL and the high-frequency component DDXH which of the on-wave and on-ruggedness components the human being wishes to be more reduced, by using the feeling based map of FIG. 5. When it is judged that the on-ruggedness component is wished to be more reduced, then the correction value Ks is set to be smaller, while, when it is judged that the on-wave component is wished to be more reduced, the correction value Ks is set to be larger.

At a step 109, the sprung mass absolute velocity corrected signal DXs and the relative velocity corrected signal DYs are derived in the following manner:

DXs←Ks·DX
DYs←DY

Subsequently, a step 110 derives the quotient (DXs/DYs) of the sprung mass absolute velocity corrected signal DXs and the relative velocity corrected signal DYs so as to set the control value V for the drive circuit 6 based on the map of FIG. 6. At a step 111, this control value V is output to the drive circuit 6.

The drive circuit 6 controls the operation of the actuator 2 based on the control value V such that a lower damping force of the shock absorber 1 is provided with a lower control value V or a higher damping force of the shock absorber 1 is provided with a higher control value V.

In the first preferred embodiment, the low-frequency component (on-wave component) and the high-frequency component (on-ruggedness component) in the sprung mass vibration, i.e. in the vehicle body vibration are extracted from the sprung mass acceleration indicative signal. As shown in FIG. 5, the feeling based correction value Ks tends to be set smaller with a larger magnitude of the high-frequency component DDXH and a smaller magnitude of the low-frequency component DDXL, and vice versa. Since the sprung mass absolute velocity corrected signal DXs is derived by Dxs←Ks·DX, when the high-frequency component DDXH included in the sprung mass vibration is larger in comparison with the low-frequency component DDXL, a lower damping force is provided as seen in FIG. 6. As also appreciated from FIG. 6, when signs of the sprung mass absolute velocity corrected signal DXs and the relative velocity corrected signal DYs are different, a lower damping force of the shock absorber 1 is provided, while, when the signs of the corrected signals DXs and DYs coincide with each other, a higher damping force of the shock absorber 1 is provided.

Further, by introducing the correction value Ks which is an index indicative of a ratio between the on-ruggedness feeling and the on-wave feeling which the human being senses, the total suspension system which is capable of matching the human being's sensuousness or feeling can be realized.

Now, a second preferred embodiment will be described with reference to FIGS. 8 to 11. The structure and operation which are the same as or similar to those of the first preferred embodiment will not be described in detail in view of avoiding the redundant disclosure.

Figure 8:
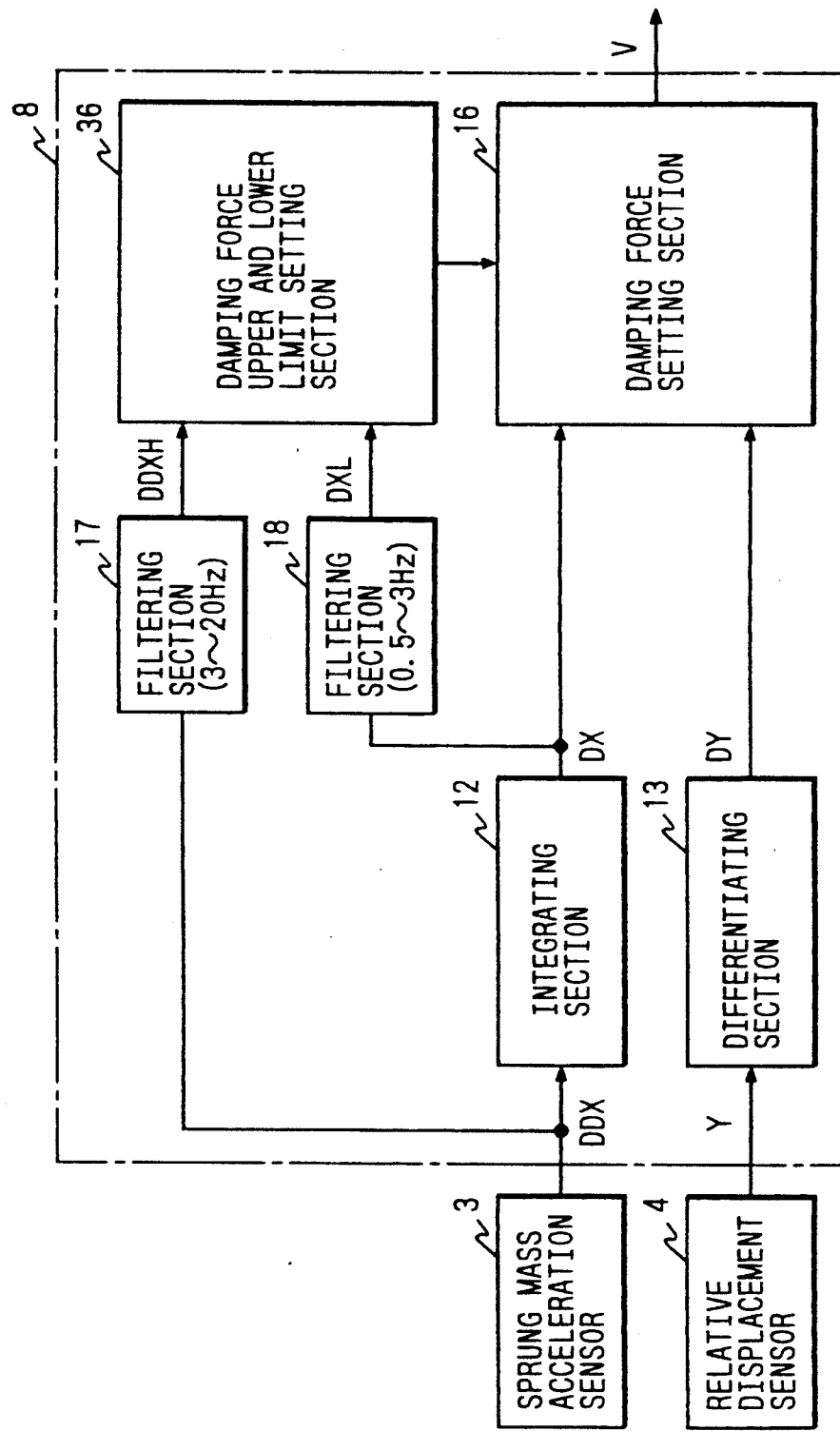
FIG. 8 is a functional block diagram of a central processing unit according to a second preferred embodiment of the present invention.
Figure 9:
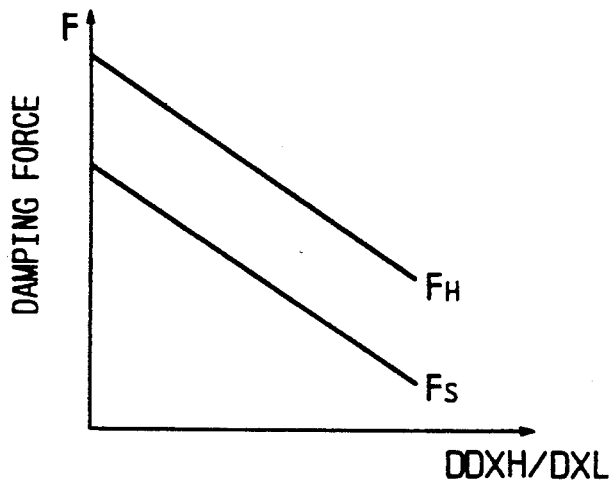
FIG. 9 is a map for setting upper and lower limit values of the damping force.

In the second preferred embodiment, the central processing unit 8 has a structure as shown in FIG. 8. Specifically, the central processing unit 8 comprises the integrating section 12, the differentiating section 13, a filtering section 17, a filtering section 18, a damping force upper-lower limit setting section 36 and the damping force setting section 16.

The filtering section 17 passes the high-frequency component DDXH of 3–20 Hz contained in the sprung mass acceleration signal DDX fed from the sprung mass acceleration sensor 3. Similarly, the filtering section 18 passes the low-frequency component DXL of 0.5–3 Hz contained in the sprung mass absolute velocity signal DX fed from the integrating section 12.

The damping force upper-lower limit setting section 36 receives the high-frequency component DDXH from the filtering section 17 and the low-frequency component DXL from the filtering section 18. The damping force upper-lower limit setting section 36 uses a map of FIG. 9 to derive a damping force upper limit value $F_H$ and a damping force lower limit value Fs in terms of the quotient (DDXH/DXL). The damping force setting section 16 derives the quotient (DX/DY) of the sprung mass absolute velocity DX and the relative speed DY and sets the damping force based on a map of FIG. 10. Specifically, the damping force setting section 16 sets the damping force to the lower limit value Fs when the quotient (DX/DY) is negative, and to the upper limit value $F_H$ when the quotient is positive and larger than a predetermined value $(DX/DY)_1$. When the quotient is between 0 (zero) and $(DX/DY)_1$, the damping force setting section 16 sets one of continuous values between the lower and upper limit values Fs and $F_H$ depending on a magnitude of the quotient (DX/DY).

Figure 10:
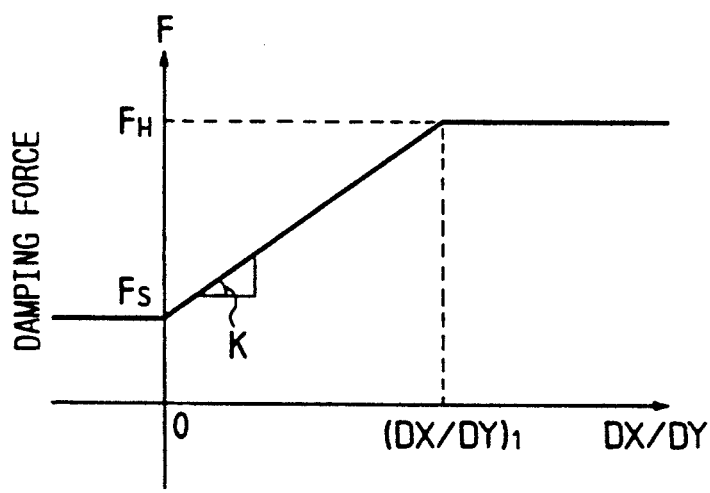
FIG. 10 is a map for determining the damping force.
Figure 11:
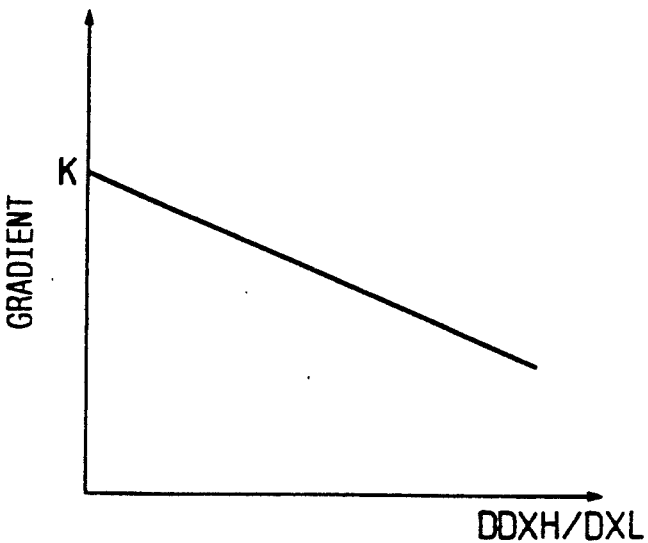
FIG. 11 is a map for deriving a gradient which determines variation characteristic of the damping force.

In a modification of the second preferred embodiment, a gradient K of a straight line between the lower and upper limit values Fs and $F_H$ in FIG. 10 may be set based on a map of FIG. 11. Specifically, as shown in FIG. 11, the gradient K is set smaller with a larger magnitude of the quotient (DDXH/DXL). In this modification, the lower and upper limit values Fs and $F_H$ are fixed to preselected values, and the damping force is determined as one of continuous values between the lower and upper limit values defined by the gradient K when the quotient (DX/DY) is between 0 and a value $(DX/DY)_1$ which is variable in this modification.

Now, a third preferred embodiment will be described with reference to FIGS. 12 to 16. The structure and operation which are the same as or similar to those of the first or second preferred embodiment will not be described in detail in view of avoiding the redundant disclosure.

Figure 12:
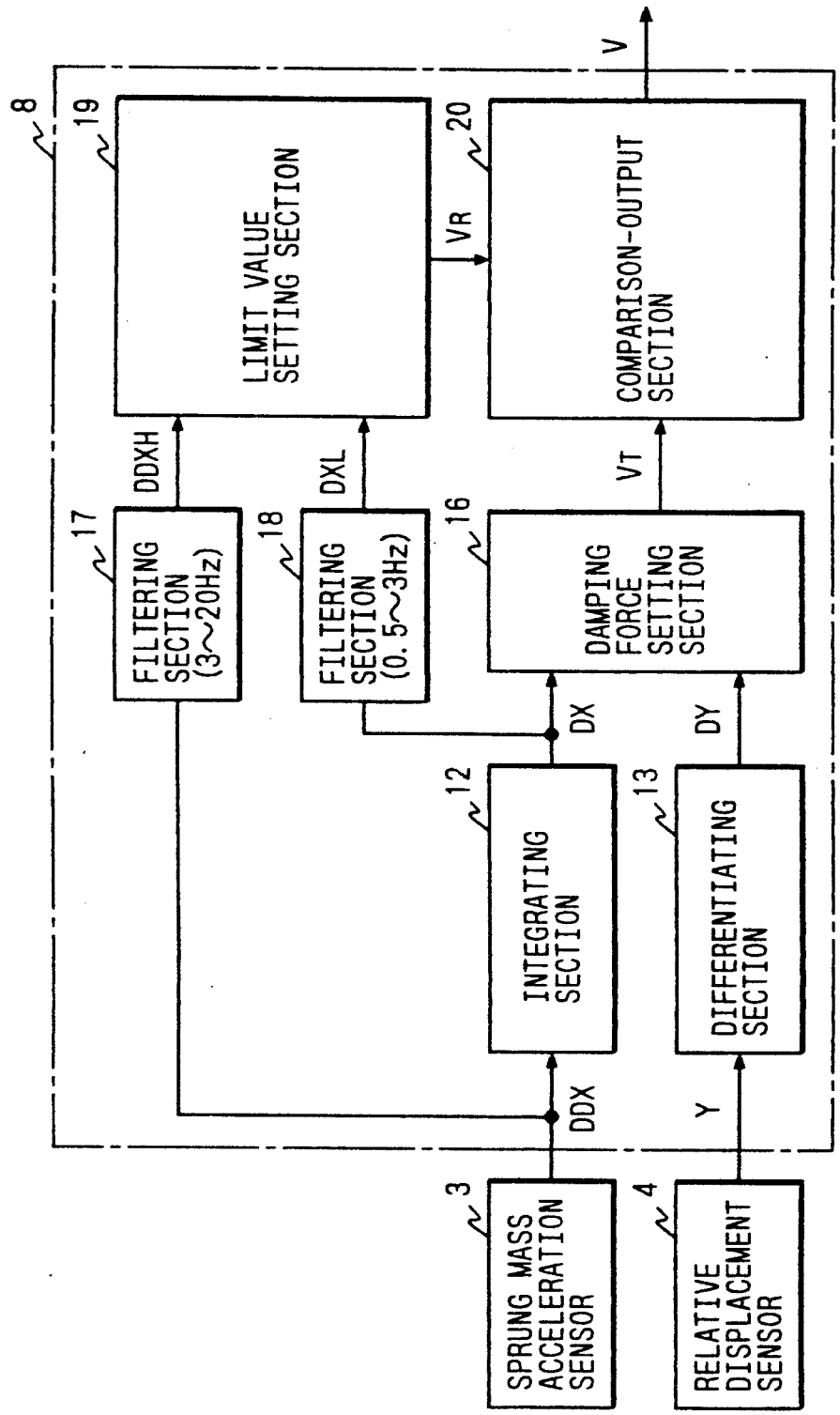
FIG. 12 is a functional block diagram of a central processing unit according to a third preferred embodiment.

As shown in FIG. 12, the central processing unit 8 comprises the integrating section 12, the differentiating section 13, the damping force setting section 16, the filtering section 17, the filtering section 18, a limit value setting section 19 and a comparison-output section 20.

Figure 13:
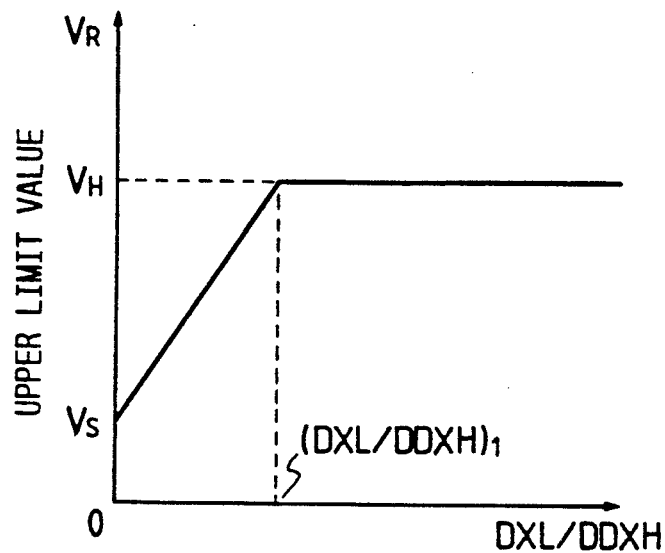
FIG. 13 is a map for setting an upper limit value of a damping force control value.

The limit value setting section 19 uses a prestored map of FIG. 13 to derive an upper limit value $V_R$ of a preliminary or tentative command or control value $V_T$ for the drive circuit 6, based on the high-frequency component DDXH from the filtering section 17 and the low-frequency component DXL from the filtering section 18. In the map of FIG. 13, an axis of abscissas is defined in terms of the quotient (DXL/DDXH) of the low-frequency component DXL and the high-frequency component DDXH, and an axis of ordinate is defined in terms of the upper limit value $V_R$ of the preliminary command value $V_T$. The upper limit value $V_R$ is set to a minimum value Vs when the quotient (DXL/DDXH) is 0 (zero), and to a maximum value $V_H$ when the quotient is larger than a predetermined value $(DXL/DDXH)_1$. The upper limit value $V_R$ is linearly increased when the quotient is increased from 0 to the predetermined value $(DXL/DDXH)_1$.

Figure 14:
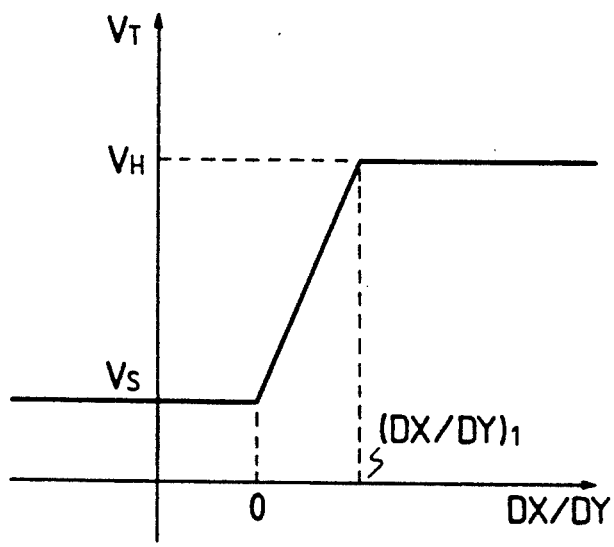
FIG. 14 is a map for deriving a preliminary command value.

The damping force setting section 16 uses a map of FIG. 14 to derive the tentative command value $V_T$ for the drive circuit 6, based on the sprung mass absolute velocity DX from the integrating section 12 and the relative velocity DY from the differentiating section 13. In the map of FIG. 14, an axis of abscissas is defined in terms of the quotient (DX/DY) of the sprung mass absolute velocity DX and the relative velocity DY, and an axis of ordinate is defined in terms of the tentative command value $V_T$. The tentative command value $V_T$ is set to the minimum value Vs when the quotient (DX/DY) is less than 0 (zero), and to the maximum value $V_H$ when the quotient is larger than a predetermined value $(DX/DY)_1$. The tentative command value $V_T$ is linearly increased when the quotient is increased from 0 to the predetermined value $(DX/DY)_1$.

Figure 15:
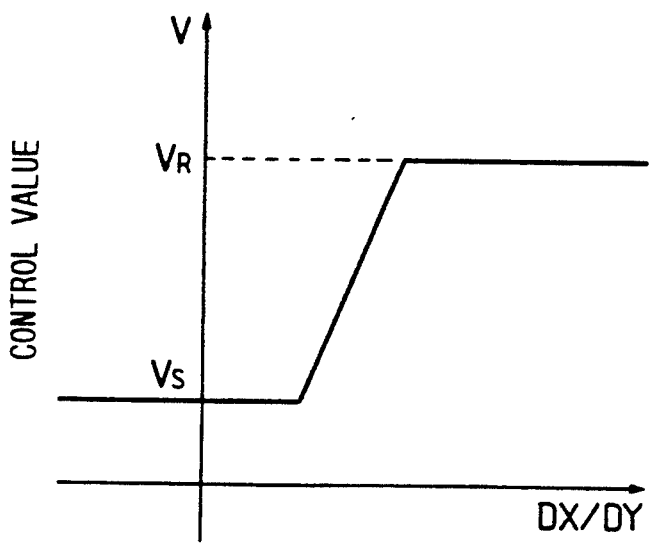
FIG. 15 is a map for deriving a damping force control value.

The comparison-output section 20 uses a map of FIG. 15 to derive a control signal V to be output to the drive circuit 6, by comparing the preliminary command value $V_T$ set in the damping force setting section 16 with the upper limit value $V_R$ set in the limit value setting section 19.

Figure 16:
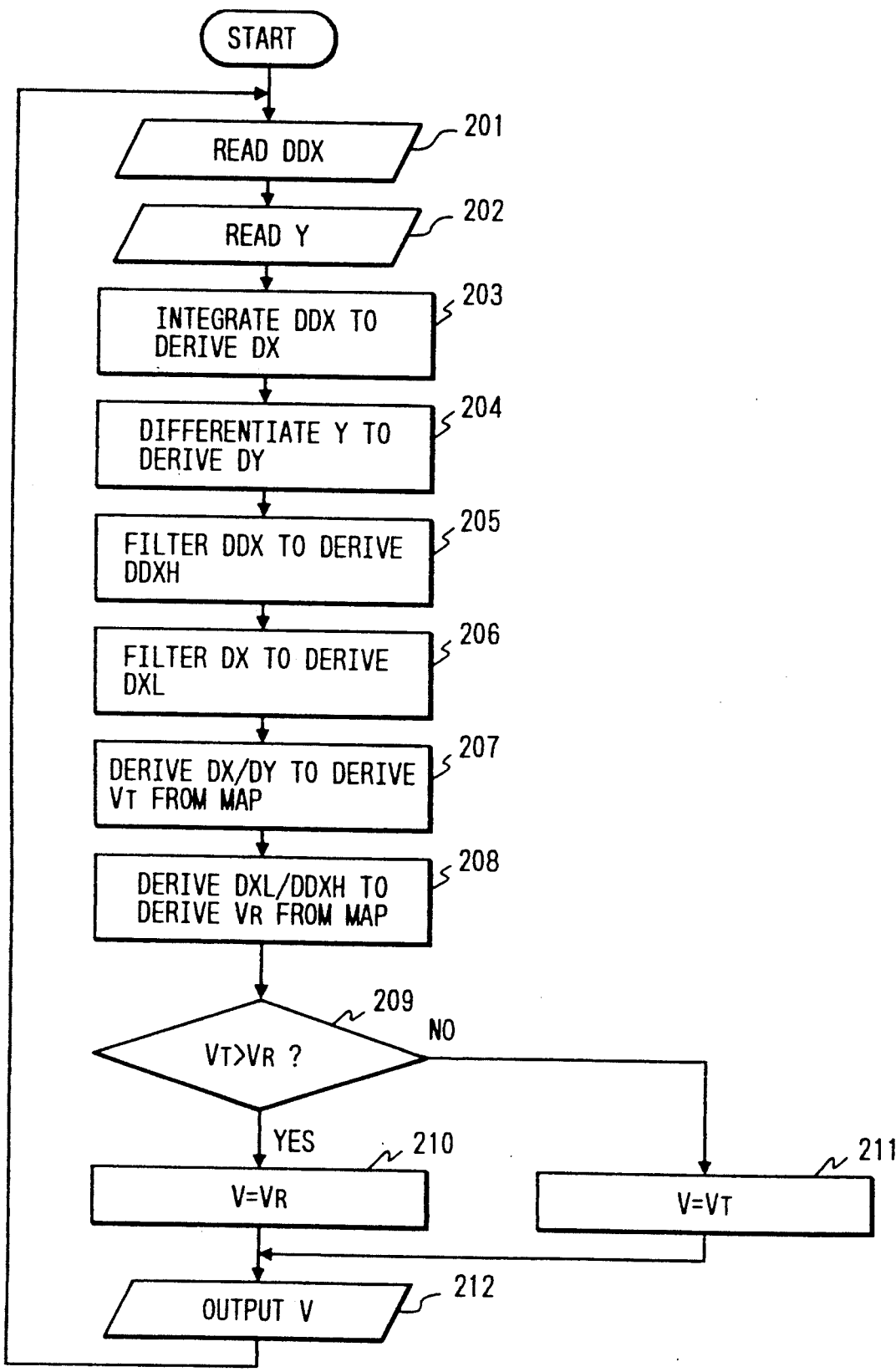
FIG. 16 is a flowchart to be executed by the central processing unit in FIG. 12 for deriving the damping force control value.

Now, the operation of the third preferred embodiment will be described with reference to a flowchart of FIG. 16 which is executed by the central processing unit 8.

A first step 201 reads out the sprung mass acceleration indicative signal DDX, and then a step 202 reads out the relative displacement indicative signal Y. A step 203 integrates the sprung mass acceleration indicative signal DDX and drives the sprung mass absolute velocity indicative signal DX, and then a step 204 differentiates the relative displacement indicative signal Y and derives the relative velocity indicative signal DY.

Subsequently, at a step 205, the sprung mass acceleration indicative signal DDX is filtered to derive the high-frequency component DDXH of 3-20 Hz which includes the on-ruggedness component. Similarly, at a step 206, the sprung mass absolute velocity indicative signal DX is filtered to derive the low-frequency component 0.5-3 Hz which includes the on-wave component. Accordingly, at the steps 205 and 206, the frequency components representing the nature of behavior of the sprung mass, i.e. the vehicle body are derived.

Subsequently, a step 207 derives the quotient (DX/DY) of the sprung mass absolute velocity indicative signal DX and the relative velocity indicative signal DY so as to set the preliminary command value $V_T$ for the drive circuit 6 based on the map of FIG. 14. A step 208 derives the quotient (DXL/DDXH) of the high-frequency component DDXH and the low-frequency component DXL so as to set the upper limit value $V_R$ of the command value $V_T$ based on the map of FIG. 13. Specifically, when the derived quotient (DXL/DDXH) is small, it is judged that the on-ruggedness behavior of the vehicle body is larger than the on-wave behavior of the vehicle body. Accordingly, the upper limit value $V_R$ is set smaller so that a lower damping force tends to be caused to avoid transmission of the unsprung mass on-ruggedness behavior to the vehicle body. On the other hand, when the quotient (DXL/DDXH) is large, it is judged that the on-wave behavior of the vehicle body is larger than the on-ruggedness behavior of the vehicle body. Accordingly, the upper limit value $V_R$ is set larger so that a higher damping force tends to be caused to effectively absorb such on wave behavior of the vehicle body. Further, by setting the upper limit value $V_R$ to increase continuously or linearly from the minimum value Vs to the maximum value $V_H$, the rapid variation of the damping force is avoided.

The routine now goes to a step 209 where the derived command value $V_T$ and the derived upper limit value $V_R$ are compared. When the derived command value $V_T$ is larger than the derived upper limit value $V_R$, the final command value or the control signal V is set to $V_R$ at a step 210. This means that the maximum value $V_H$ in the map of FIG. 14 is set to be the upper limit value $V_R$ as shown in FIG. 15. Specifically, judging that the on-ruggedness behavior of the vehicle body is generated to the extent which can not be effectively suppressed by the damping force corresponding to the command value $V_T$, the control signal V is set smaller to the upper limit value $V_R$. Accordingly, the damping force of the shock absorber 1 is lowered to effectively suppress the on-ruggedness behavior of the vehicle body. On the other hand, when the derived command value $V_T$ is not more than the upper limit value $V_R$, the control signal V is set to the derived command value $V_T$ at a step 211. Subsequently, at a step 212, the control signal V derived at the step 210 or 211 is output to the drive circuit 6 for controlling the damping force of the shock absorber 1 via the actuator 2.

By controlling the damping force in the manner as described above, the damping force of the shock absorber is controlled according to the vehicle body behavior to satisfy the human being's sensuousness or feeling. As a result, the riding comfort is improved in any road surface conditions.

Figure 17:
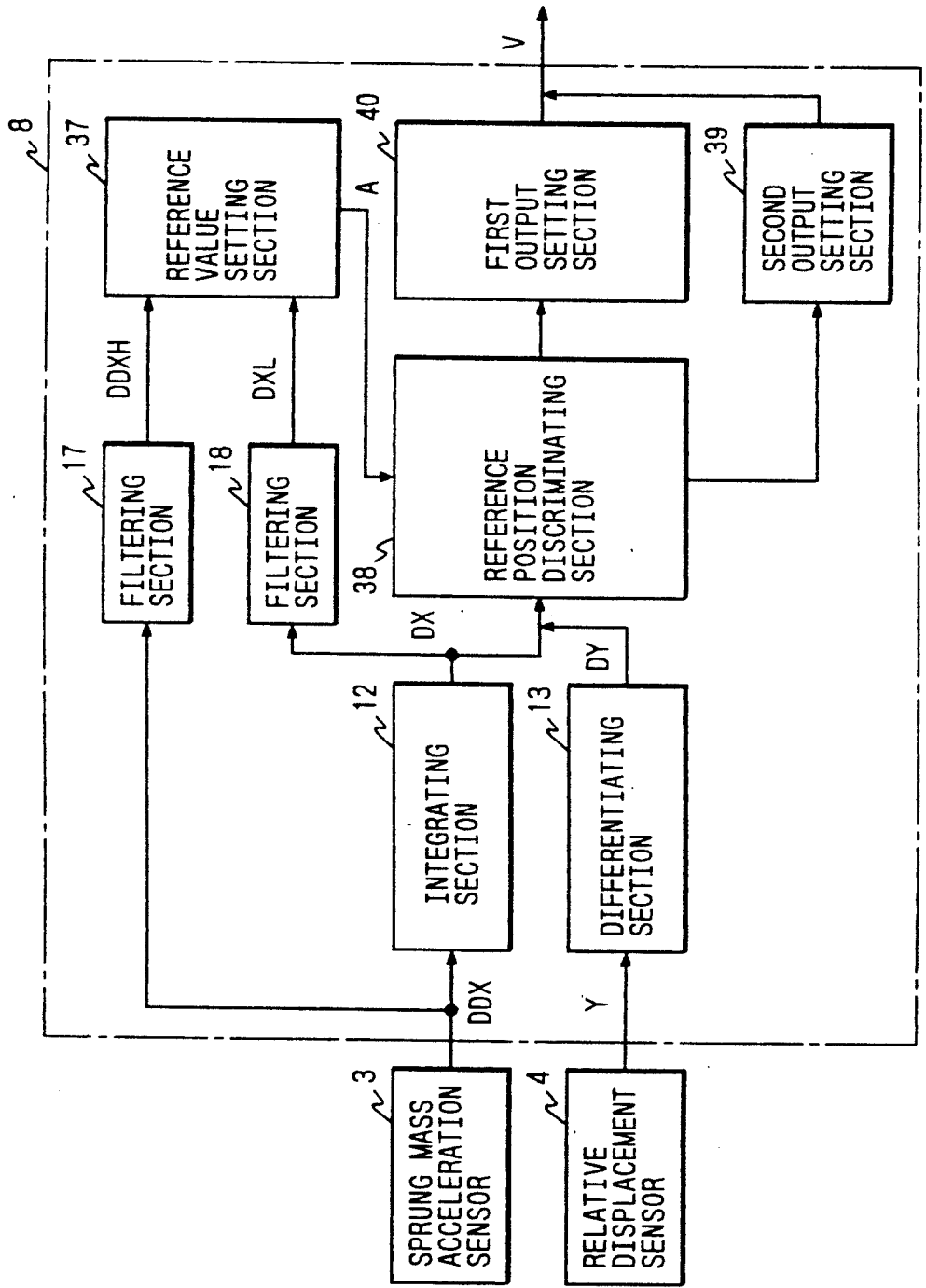
FIG. 17 is a functional block diagram of a central processing unit according to a modification of the third preferred embodiment.

In a modification of the third preferred embodiment, as shown in FIG. 17, the center processing unit 8 includes a reference value setting section 37, a reference position discriminating section 38, a second output setting section 39 and a first output setting section 40, instead of the limit value setting section 19, the damping force setting section 16 and the comparison-output section 20 in FIG. 12.

Figure 18:
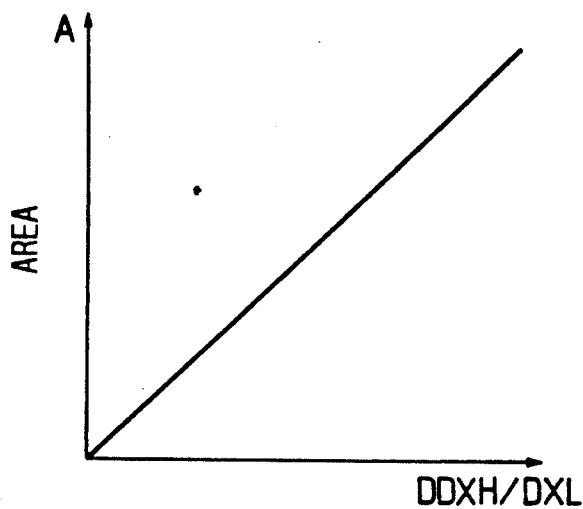
FIG. 18 is a map for switching damping force variation characteristics.

The reference value setting section 37 uses a prestored map of FIG. 18 to set an area A which is used as a reference value for switching damping force varying characteristics, based on the high-frequency component DDXH derived through the filtering section 17 and the low-frequency component DXL derived through the filtering section 18. In the map of FIG. 18, an axis of abscissas is defined in terms of the quotient (DDXH/DXL) of the high-frequency component DDXH and the low-frequency component DXL, and an axis of ordinate is defined in terms of the area A.

The reference position discriminating section 38 receives the sprung mass absolute velocity DX from the integrating section 12 and the relative velocity DY between the sprung and unsprung masses to decide whether a imaginary position defined by these velocities DX and DY is within the area A set in the reference value setting section 37.

Figure 19:
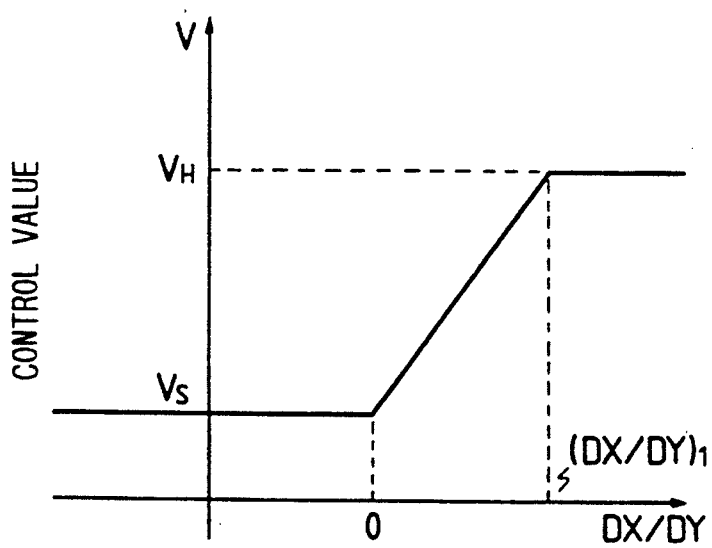
FIG. 19 is a map for deriving a damping force control value.
Figure 20:
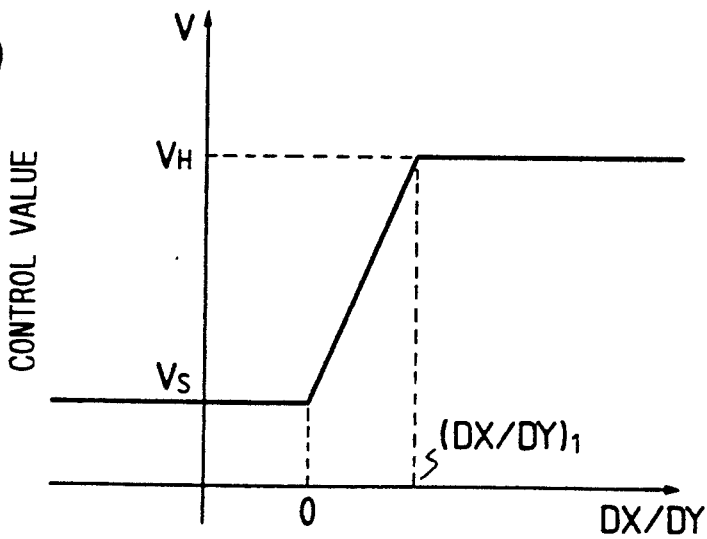
FIG. 20 is a map for deriving a damping force control value.

The second output setting section 39 and the first output setting section 40 respectively use maps of FIGS. 19 and 20 to derive control signal values V. In each of the maps of FIGS. 19 and 20, an axis of abscissas is defined in terms of the quotient (DX/DY) of the sprung mass absolute velocity DX and the relative velocity DY, and an axis of ordinate is defined in terms of the control signal value V. The control signal value V is set to a minimum value $V_S$ when the quotient (DX/DY) is less than 0 (zero), and to a maximum value $V_H$ when the quotient is larger than a predetermined value $(DX/DY)_1$. The control signal value V is linearly increased from the minimum value $V_S$ to the maximum value $V_H$ when the quotient is from 0 to the predetermined value $(DX/DY)_1$.

Now, the operation of this modification of the third preferred embodiment will be described hereinbelow.

The reference value setting section 37 derives the area A based on the quotient (DDXH/DXL) of the high-frequency component DDXH and the low-frequency component DXL, using the map of FIG. 18. As seen in FIG. 18, the switching area A is set larger with a larger value of the quotient (DDXH/DXL). Specifically, a magnitude of the area A increases with a larger magnitude of the high-frequency component DDXH or with a smaller magnitude of the low-frequency component DXL. After setting the area A, the reference position discriminating section 38 derives absolute values |DX| and |DY| of the sprung mass absolute velocity DX and the relative velocity DY, respectively. The reference position discriminating section 38 compares the absolute value |DX| with the derived area A and compares the absolute value |DY| with a product (k·A) of the derived area A and a coefficient k to decide whether an imaginary reference position defined by the absolute values |DX| and |DY| is within the derived area A. Specifically, when the absolute value |DX| is smaller than the area A (|DX|<A), and the absolute value |DY| is smaller than the product (|DY|<k·A), it is decided that the reference position is within the area A. Since the area A is set larger when the high-frequency component is large relative to the low-frequency component to cause the on-ruggedness behavior of the vehicle body, the reference position is more likely to be judged within the area A. On the other hand, since the area A is set smaller when the low-frequency component is large relative to the high-frequency component to cause the on-wave behavior of the vehicle body, the reference position is more likely to be judged outside the area A.

When it is judged that the reference position is within the area A, the second output setting section 39 uses the map of FIG. 19 to set the control signal V. When it is judged that the reference position is outside the area A, the first output setting section 40 uses the map of FIG. 20 to set the control signal V. As seen in FIGS. 19 and 20, the damping force varying characteristic of FIG. 20 inclines to provide a higher damping force, i.e. a larger magnitude of the control signal V than that of FIG. 19. Accordingly, when the high-frequency component is dominating to generate the on-ruggedness behavior of the vehicle body, a lower damping force tends to be provided, while, when the low-frequency component is dominating to generate the on-wave behavior of the vehicle body, a higher damping force tends to be provided.

In a further modification of the third preferred embodiment, the high-frequency component may be extracted from the sprung mass absolute velocity indicative signal DX, the relative displacement indicative signal Y between the sprung and unsprung masses or the relative velocity indicative signal DY, instead of the sprung mass acceleration indicative signal DDX. Similarly, the low-frequency component may be extracted from the sprung mass acceleration indicative signal DDX, the relative displacement indicative signal Y or the relative velocity indicative signal DY, instead of the sprung mass absolute velocity indicative signal DX.

Figure 21:
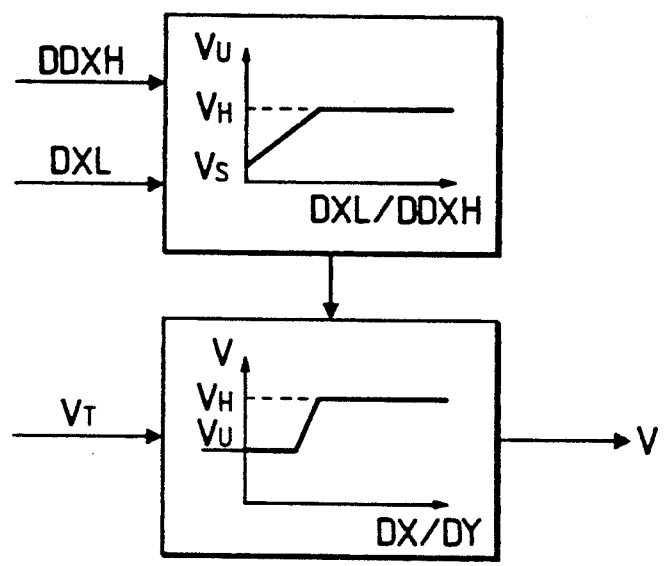
FIG. 21 is a map for deriving a damping force control value, according to another modification of the third preferred embodiment.
Figure 22:
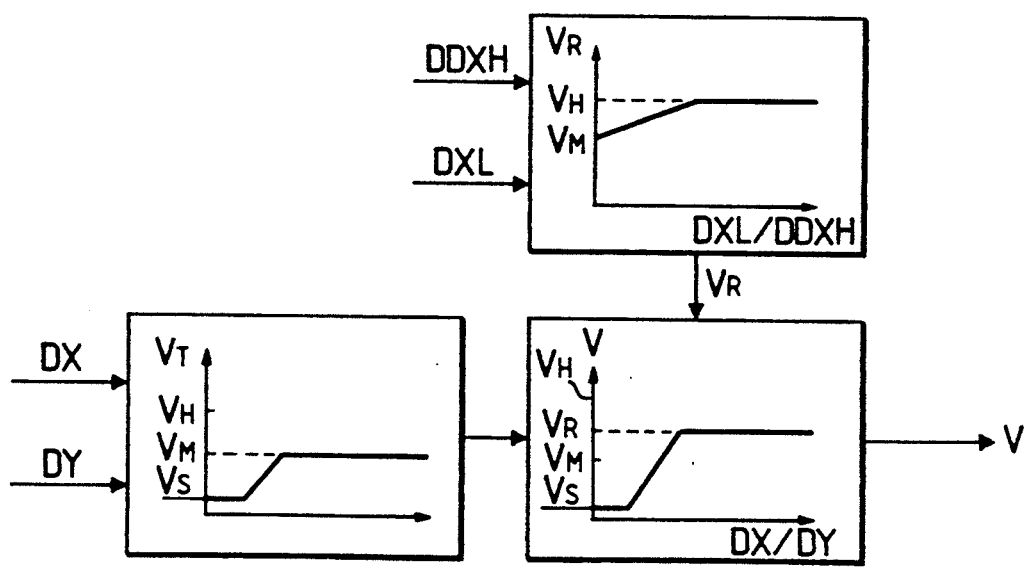
FIG. 22 is a map for deriving a damping force control value, according to still another modification of the third preferred embodiment.

Further, although, in the third preferred embodiment, the upper limit value $V_R$ of the command value $V_T$ is set based on the quotient (DXL/DDXH), and the control signal value V is clipped to the upper limit value $V_R$ when the command value $V_T$ is larger than the upper limit value $V_R$, it may be arranged that a lower limit value $V_U$ of the command value $V_T$ is set based on the quotient (DXL/DDXH), and that the control signal value V is clipped to the lower limit value $V_U$ when the command value $V_T$ is smaller than the lower limit value $V_U$, as shown in FIG. 21. It may also be arranged that the upper limit value $V_R$ is set based on the quotient (DXL/DDXH) so as to set the upper limit of the control signal value V to be large, as shown in FIG. 22.

Further, although, in the third preferred embodiment, the map of FIG. 15 is used when the relative velocity DY is both positive and negative, it may be arranged that the map is used to derive the control signal V only when the relative velocity DY is positive or negative.

Figure 23:
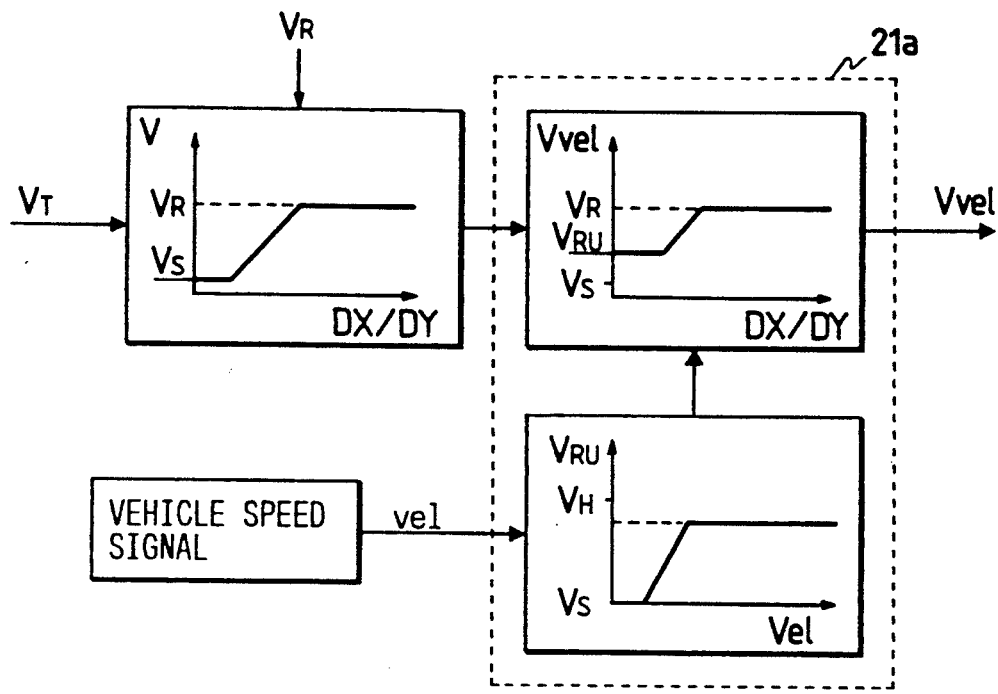
FIG. 23 is a map for deriving a damping force control value, according to still another modification of the third preferred embodiment.

In a still further modification of the third preferred embodiment, a vehicle speed sensor is provided for monitoring a vehicle speed to produce a vehicle speed indicative signal vel which is used to correct the control signal V derived at the comparison-output section 20 in FIG. 12, or at the first or second output setting section 40 or 39 in FIG. 17. Specifically, as shown in FIG. 23, an output correcting section 21a derives a lower limit value $V_{RU}$ based on the monitored vehicle speed. This lower limit value $V_{RU}$ is used to correct the control signal V derived at the comparison-output section 20 in FIG. 12 so as to derive a final control signal Vvel. This control signal Vvel is fed to the drive circuit 6 to control the damping force via the actuator 2 so that the damping force control is performed considering the vehicle speed in addition to the vehicle body behavior to further improve the riding comfort. As appreciated from FIG. 23, the correction at the output correcting section 21a is also applicable to the control signal V derived at the first or second output setting section 40 or 39.

A fourth preferred embodiment will be described below. However, the explanation thereof will refer to only what is modified from the first preferred embodiment, so as to avoid the redundant disclosure.

In the first preferred embodiment, the low-frequency component DDXL and the high-frequency component DDXH are derived based on the signal from the sprung mass acceleration sensor 3. In the fourth preferred embodiment, these components may be derived based on the signal from the relative displacement sensor 4, or a signal from a vehicular wheel speed sensor, or a signal from a pressure sensor in the shock absorber 1.

A fifth preferred embodiment will be described below with respect to only what is modified from the first preferred embodiment.

In the first preferred embodiment, each of the low-frequency component DDXL and the high-frequency component DDXH is derived by sampling peak values at predetermined sampling periods from the filtered signal past the band-pass filter BPF and averaging the absolute values of the sampled peak values of the preceding X or Y times. In the fifth preferred embodiment, the low-frequency component DDXL is derived based on the filtered signal past the band-pass filter BPF having a pass band of 0.5–3 Hz, by using the following equation:

$$DDXL = \sqrt{\frac{\sum_{n=1}^{x} P^2 n}{X}}$$

wherein, X is the preceding sampling times, and P is a peak hold value.

Similarly, the high-frequency component DDXH is derived based on the filtered signal past the band-pass filter BPF having a pass band of 3–20 Hz, by using the following equation:

$$DDXL = \sqrt{\frac{\sum_{n=1}^{y} P^2 n}{Y}}$$

wherein, Y is the preceding sampling times, and P is a peak hold value.

A sixth preferred embodiment will be described hereinbelow with respect to only what is modified from the first preferred embodiment.

In the first preferred embodiment, the signal correction section 15 in FIG. 2 derives the sprung mass absolute velocity corrected signal DXs by multiplying only the sprung mass absolute velocity DX by the feeling based correction value Ks. In the sixth preferred embodiment, the feeling based correction value Ks may also be used to derive the relative velocity corrected signal DYs as follows:

DXs←Ks·DX
DYs←DY/Ks

A seventh preferred embodiment will be described hereinbelow with respect to only what is modified from the first preferred embodiment.

Figure 24:
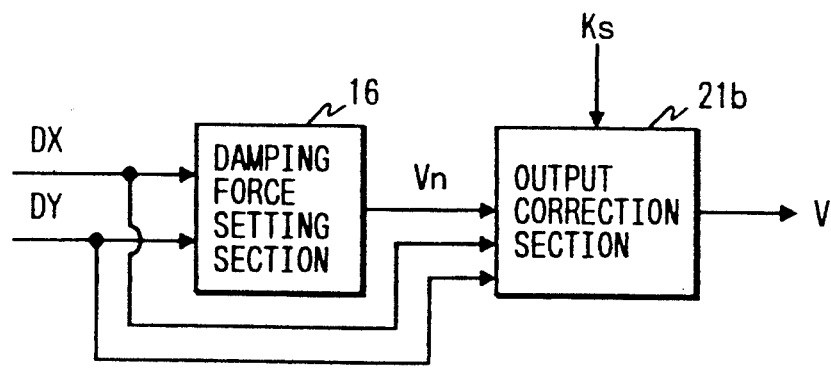
FIG. 24 is a functional block diagram showing a portion of a central processing unit according to a seventh preferred embodiment.

In the first preferred embodiment, the correction value Ks derived at the feeling based correction value setting section 14 is used in the signal correction section 15. In the seventh preferred embodiment, as shown in FIG. 24, an output correction section 21b is provided in place of the signal correction section 15. In the output correction section 21b, an output Vn of the damping force setting section 16 is corrected to a control signal V when an imaginary position defined by the sprung mass absolute velocity DX and the relative velocity DY is within a dead area. The dead area is defined by the following condition.

DX<K1/Ks and DY<K2/Ks wherein, K1 and K2 are predetermined values, respectively.

An eighth preferred embodiment will be described hereinbelow with respect to only what is modified from the first preferred embodiment.

Figure 25:
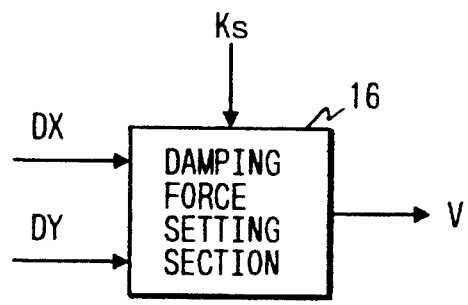
FIG. 25 is a functional block diagram showing a portion of a central processing unit according to an eighth preferred embodiment.

In the first preferred embodiment, the correction value Ks derived at the feeling based correction value setting section 14 is used in the signal correction section 15. In the eighth preferred embodiment, as shown in FIG. 25, the signal correction section 15 is omitted, and the map of FIG. 6 is modified such that the axis of abscissas is defined in terms of DX/DY−(1/Ks) instead of DXs/DYs.

A ninth preferred embodiment will be described hereinbelow with respect to only what is modified from the first preferred embodiment.

In the first preferred embodiment, the correction value Ks derived at the feeling based correction value setting section 14 is used in the signal correction section 15. In the ninth preferred embodiment, as shown in FIG. 24, an output correction section 21b is provided in place of the signal correction section 15. In the output correction section 21b, when a condition of $|V_n - V_{n-1}| > K \cdot K_s$ is satisfied, $V = V_{n-1} + K \cdot K_s$ provided that $V_n - V_{n-1}$ is positive, and $V = V_{n-1} - K \cdot K_s$ provided that $V_n - V_{n-1}$ is negative, wherein Vn is a current output value of the damping force setting section 16, $V_{n-1}$ is a last output value of the damping force setting section 16, V is a control signal fed to the driver circuit 6 and K is a predetermined value.

In a modification of the ninth preferred embodiment, the output correction section 21 may simply correct the control signal V to Ks·Vn.

A tenth preferred embodiment will be described hereinbelow with respect to only what is modified from the first preferred embodiment.

In the first preferred embodiment, the signal correction section 15 executes the velocity correction only based on the correction value Ks derived in the feeling based correction value setting section 14. In the tenth preferred embodiment, as shown in FIG. 26, a vehicle speed sensor is provided for monitoring a vehicle speed to produce a vehicle speed indicative signal vel, and a vehicle speed based correction value setting section 22 is provided in the central processing unit 8 for setting a vehicle speed based correction value Kv based on the vehicle speed indicative signal vel.

Figure 26:
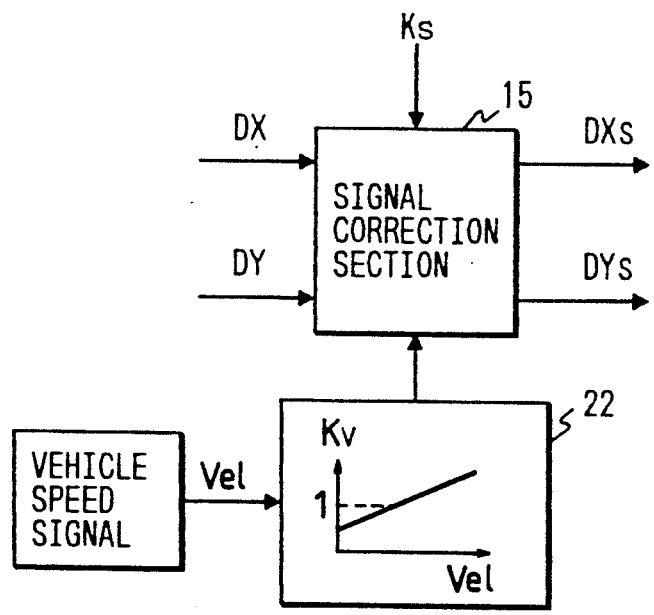
FIG. 26 is a functional block diagram showing a portion of a central processing unit according to a tenth preferred embodiment.

Specifically, in the map of the vehicle speed based correction value setting section 22 in FIG. 26, the vehicle speed based correction value Kv is set to be increased with a larger magnitude of the vehicle speed indicative signal vel. The signal correction section 15 corrects the sprung mass absolute velocity DX and the relative velocity DY based on the vehicle speed based correction value Kv and the feeling based correction value Ks in the following manner.

DXs←Ks·Kv·DX
DYs←DY
or
DXs←DX
DYs←DY/Ks/Kv

By this correction, the damping force of the shock absorber 1 is controlled not only based on the predicted vehicle body behavior, but also based on the monitored vehicle speed so as to further improve the riding comfort.

An eleventh preferred embodiment will be described hereinbelow with respect to only what is modified from the first preferred embodiment.

In the first preferred embodiment, both the sprung mass acceleration sensor 3 and the relative displacement sensor 4 are provided. The eleventh preferred embodiment is not provided with the sprung mass acceleration sensor 3. The sprung mass velocity is estimated based on the relative displacement indicative signal from the relative displacement sensor 4, and the on-ruggedness component and the on-wave component which cooperatively indicate the vehicle body vibrational condition are extracted based on the relative displacement indicative signal from the relative displacement sensor 4. This arrangement makes it possible to provide a simpler and less costly system.

A twelfth preferred embodiment will be described hereinbelow with respect to only what is modified from the first preferred embodiment.

In the twelfth preferred embodiment, each of the low-frequency component DDXL and the high-frequency component DDXH is derived by filtering the signal indicative of the foregoing absolute value through a low-pass filter having a predetermined cut-off frequency.

In a modification of the twelfth preferred embodiment, a corrected on-wave component indicative value DDXL' and a corrected on-ruggedness component indicative value DDXH' are derived based on the following equations:

DDXL'←MAX (DDXLA, DDXLF)
DDXH'←MAX (DDXHA, DDXHF)

wherein, DDXLA and DDXHA are the above-noted absolute values, respectively, DDXLF and DDXHF are the above noted filtered DDXLA and DDXHA, respectively, and MAX (,) are maximum value choice functions, respectively.

A thirteenth preferred embodiment will be described hereinbelow with respect to only what is modified from the first preferred embodiment.

Figure 27:
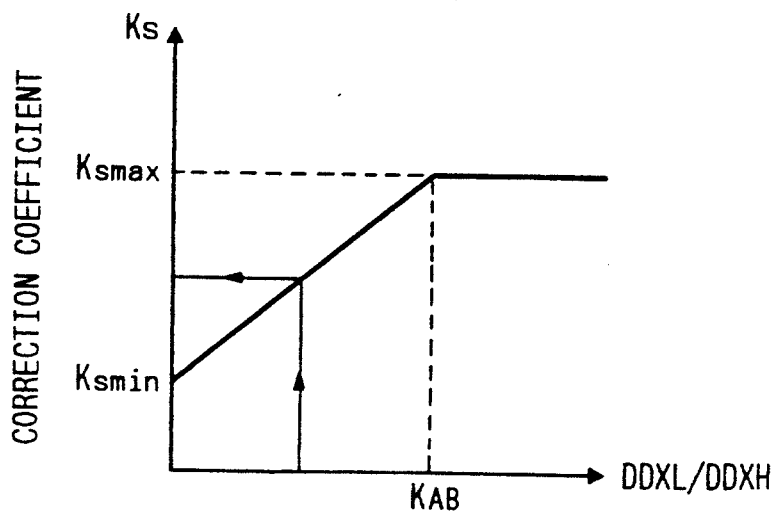
FIG. 27 is a map for deriving a correction value, according to a thirteenth preferred embodiment.

In the first preferred embodiment, the feeling based correction value setting section 14 derives the correction value Ks based on the map of FIG. 5. In the thirteenth preferred embodiment, the correction value Ks is derived based on a map of FIG. 27 or the following equation which is equivalent to the map of FIG. 27:

$$Ks = Ksmin + \frac{Ksmax - Ksmin}{K_{AB}} \cdot \frac{DDXL}{DDXH} \quad (< Ksmax)$$

wherein, Ksmin is a minimum value of Ks, Ksmax is a maximum value of Ks, and $K_{AB}$ is a value of DDXL/DDXH when Ksmax is established.

In a modification of the thirteenth preferred embodiment, the feeling based correction value Ks is derived as a function of a difference between the on-wave component and the on-ruggedness component, for example, by the following equation:

Ks = Kso + Kc·(DDXL − DDXH)

wherein, Ksmin ≦ Ks ≦ Ksmax, and wherein Kso is a value of the correction coefficient Ks when DDXL=DDXH, and Kc is a predetermined coefficient.

A fourteenth preferred embodiment will be described hereinbelow with respect to only what is modified from the first preferred embodiment.

Figure 28:
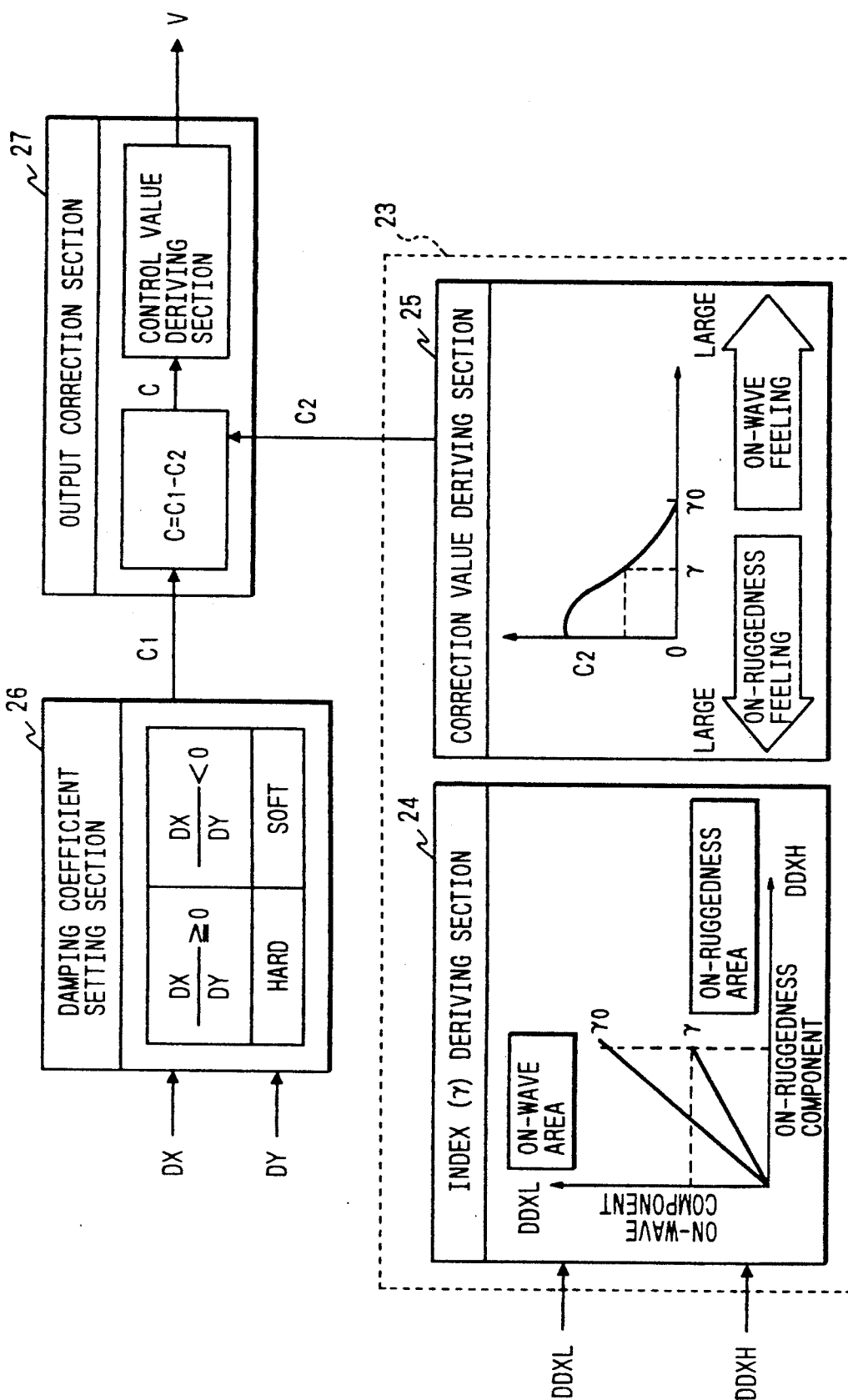
FIG. 28 is a functional block diagram showing a portion of a central processing unit according to a fourteenth preferred embodiment.

As shown in FIG. 28, an index deriving section 24 of a feeling based correction value setting section 23 derives a ratio r of the on-wave component relative to the on-ruggedness component. A correction value deriving section 25 derives a correction value $C_2$ based on a map or an equivalent function which defines a larger correction value $C_2$ with a smaller magnitude of the ratio r which represents a larger ratio of the on-ruggedness component. An output correction section 27 derives a control signal value V based on a corrected damping coefficient C which is derived by subtracting the correction value $C_2$ from a damping coefficient $C_1$ derived in a damping coefficient setting section 26. The control signal value V is supplied to the drive circuit 6 so as to control the damping force of the shock absorber 1 via the actuator 2. As seen from FIG. 28, the damping coefficient setting section 26 sets a larger coefficient $C_1$ for a hard mode where the high damping force is provided, when the quotient (DX/DY) is larger than or equal to 0 (zero), while, a smaller coefficient $C_1$ is set for a soft mode where the low damping force is provided, when the quotient (DX/DY) is less than 0.

A fifteenth preferred embodiment will be described hereinbelow with respect to only what is modified from the first preferred embodiment.

In the first preferred embodiment, the correction coefficient Ks is derived by using both the low-frequency component DDXL and the high-frequency component DDXH. In the fifteenth preferred embodiment, the correction coefficient Ks is derived based on one of these components.

Figure 29:
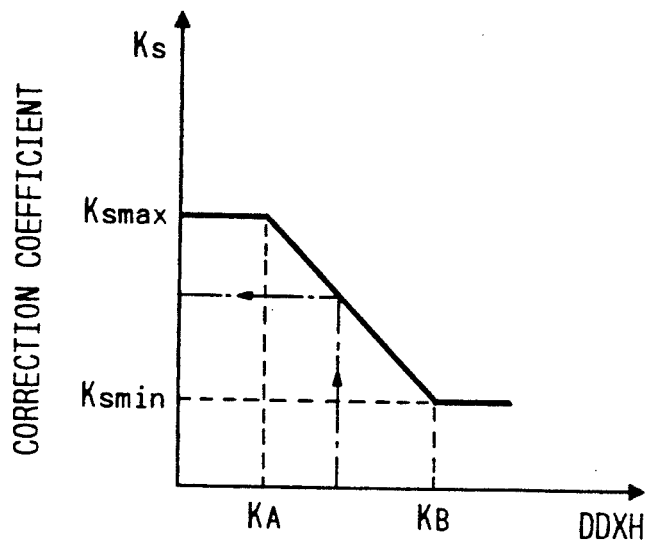
FIG. 29 is a map for deriving a correction value, according to a fifteenth preferred embodiment.

Specifically, the feeling based correction value Ks is derived by using a map of FIG. 29. In the map of FIG. 29, Ksmin and Ksmax are preset minimum and maximum values of the correction value Ks, respectively, $K_A$ is a value of the high-frequency component DDXH when the correction value Ks starts to decrease from Ksmax, and $K_B$ is a value of DDXH when Ks is Ksmin. As seen in FIG. 29, the correction value Ks is defined as decreasing as a linear function of DDXH when DDXH takes a value from $K_A$ to $K_B$. However, the degree of the function is arbitrary as long as the function is a monotone decreasing function relative to DDXH. Further, instead of using the map of FIG. 29, the correction value Ks is derived by using a corresponding functional equation or other monotone decreasing functional equations of arbitrary degrees.

The correction value Ks derived in the manner as described above is used in the signal correction section 15 to correct the sprung mass absolute velocity DX as in the first preferred embodiment, which is as follows:

DXs←Ks·DX
DYs←DY

The further processing to derive the control signal V is the same as in the first preferred embodiment.

A sixteenth preferred embodiment will be described hereinbelow with respect to only what is modified from the first preferred embodiment.

In the sixteenth preferred embodiment, a plurality of maps or corresponding functional equations are prestored for deriving the feeling based correction value Ks. Specifically, by operating a manual switch provided near a driver's seat, one of the prestored maps or functional equations is selected so as to change the variation characteristic of the correction value Ks. Alternatively, it may also be arranged that a sensor is provided whose output voltage value is variable in a continuous fashion according to a selected position of the manual switch and that a magnitude of the correction value Ks is continuously corrected according to a magnitude of the sensor output signal. By this arrangement, the driver's preference reflects on the control of the riding comfort.

A seventeenth preferred embodiment will be described hereinbelow with respect to only what is modified from the first preferred embodiment.

The seventeenth preferred embodiment relates to the total vehicular suspension control system for controlling the damping force at each of the four vehicular wheels.

Figure 30:
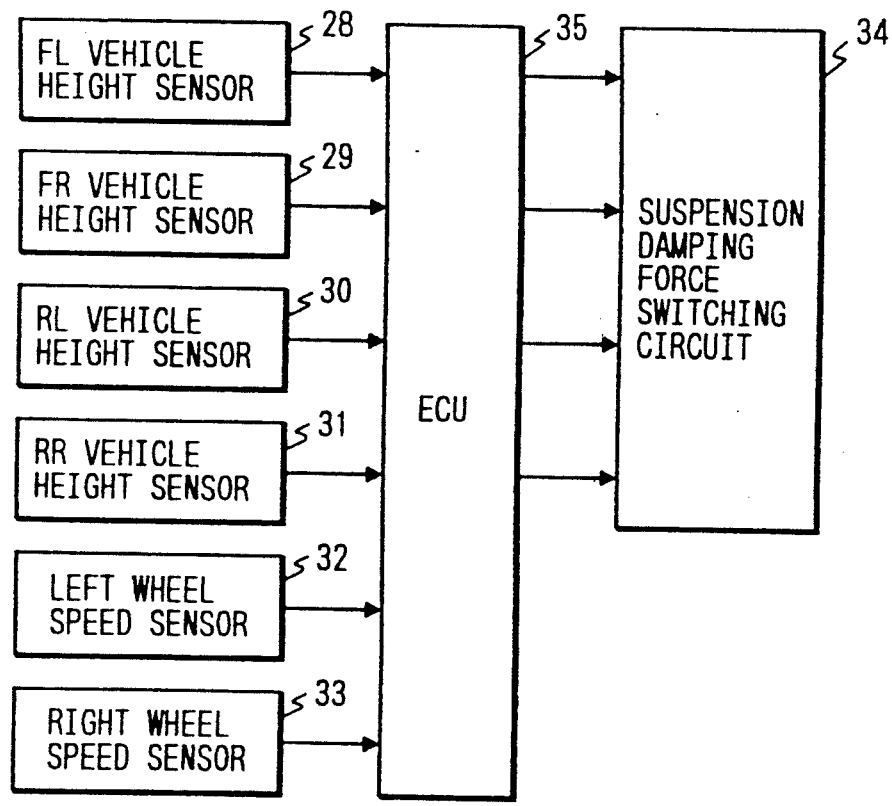
FIG. 30 is a schematic block diagram of a shock absorber damping force control system according to a seventeenth preferred embodiment.

As shown in FIG. 30, the suspension control system includes vehicular height sensors 28, 29, 30 and 31 for monitoring respective vehicular heights $H_{FL}$, $H_{FR}$, $H_{RL}$ and $H_{RR}$ at corresponding front-left (FL), front-right (FR), rear-left (RL) and rear-right (RR) wheels, a left wheel speed sensor 32, and a right wheel speed sensor 33. The suspension control system further includes an electronic control unit (ECU) 35 which derives sprung mass velocities and relative velocities between the sprung mass and the unsprung masses based on signals from the vehicular height sensors, and then corrects the derived sprung mass velocities or the derived relative velocities depending on magnitudes of harshness components extracted from the vehicular height indicative signals. The ECU 35 varies stiffness or hardness of the suspension depending on a relationship in signs of the sprung mass velocities and the relative velocities, by operating a suspension hardness switching circuit 34.

Now, the operation of the seventeenth preferred embodiment will be described with reference to a flow-chart of FIG. 31 which is executed by the ECU 35.

A first step executes initialization. At a step 302, the signals from the vehicular height sensors 28 to 31 are respectively read out to derive the respective vehicular heights $H_{FL}$, $H_{FR}$, $H_{RL}$ and $H_{RR}$. Subsequently, a step 303 reads out the pulse signals from the respective left and right wheel speed sensors 32 and 33 to derive a left wheel speed $V_L$ and a right wheel speed $V_R$, and further to derive a vehicle speed $V_B [V_B = (V_L + V_R)/2]$.

At steps 304 and 305, the sprung mass velocity DX and the relative velocity DY at each wheel are respectively derived based on the corresponding vehicular height indicative signal. Subsequently, at a step 306, a harshness component is derived by filtering each of the vehicular height $H_{FL}$ indicative signal and the vehicular height $H_{FR}$ indicative signal using a band-pass filter having a pass band of 10–30 Hz. The step 306 further derives absolute values ($H_{HSFL}$, $H_{HSFR}$) of the derived harshness components.

Figure 32:
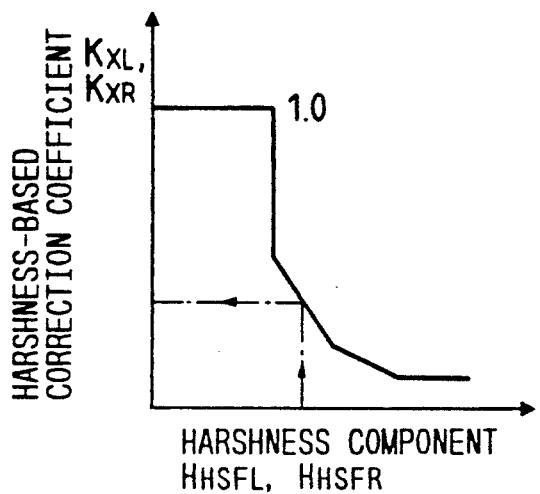
FIG. 32 is a map for deriving a harshness-based correction coefficient.
Figure 33:
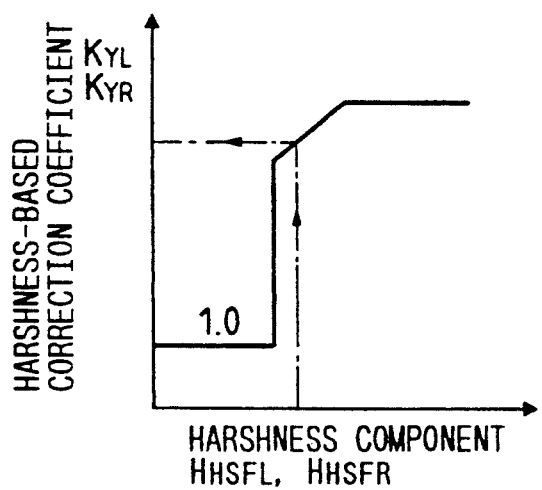
FIG. 33 is a map for deriving a harshness-based correction coefficient.

At a step 307, harshness based correction coefficients $K_{XL}$, $K_{XR}$, or $K_{YL}$, $K_{YR}$ are derived based on the harshness component absolute values ($H_{HSFL}$, $H_{HSFR}$) derived at the step 306, by using a map of FIG. 32 or FIG. 33.

Figure 34:
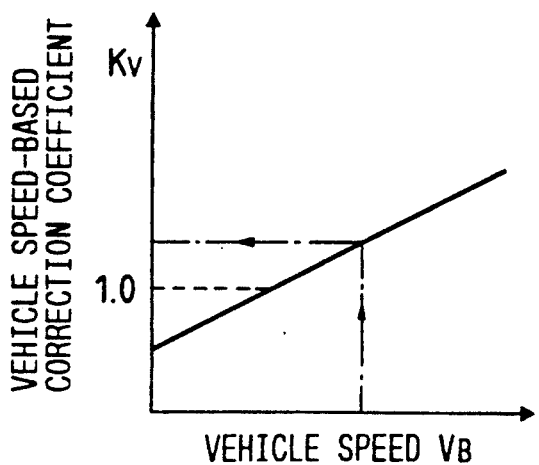
FIG. 34 is a map for deriving a vehicle speed-based correction coefficient.

Subsequently, a step 308 derives a vehicle speed based correction coefficient Kv based on the monitored vehicle speed $V_B$, by using a map of FIG. 34. The step 308 derives a corrected sprung mass velocity $DXH_{FL}$, $DXH_{FR}$, $DXH_{RL}$, $DXH_{RR}$ or a corrected relative velocity $DYH_{FL}$, $DYH_{FR}$, $DYH_{RL}$, $DYH_{RR}$ at each wheel in the following manner, during a time period defined by a quotient (=a wheel base/$V_B$).

$DXH_{FL} \leftarrow DX_{FL} \cdot K_{XL} \cdot Kv$
$DXH_{FR} \leftarrow DX_{FR} \cdot K_{XR} \cdot Kv$
$DXH_{RL} \leftarrow DX_{RL} \cdot K_{XL} \cdot Kv$
$DXH_{RR} \leftarrow DX_{RR} \cdot K_{XR} \cdot Kv$
or
$DYH_{FL} \leftarrow DY_{FL} \cdot K_{YL}/Kv$
$DYH_{FR} \leftarrow DY_{FR} \cdot K_{YR}/Kv$
$DYH_{RL} \leftarrow DY_{RL} \cdot K_{YL}/Kv$
$DYH_{RR} \leftarrow DY_{RR} \cdot K_{YR}/Kv$ The routine now goes to a step 309 where the derived $DXH_{FL-RR}$ are respectively used as DXs in FIG. 6, or the derived $DYH_{FL-RR}$ are respectively used as DYs in FIG. 6, so as to derive control signals $V_{FL-RR}$ which are fed to the driver circuit 6 to control the damping force of the shock absorbers 1, i.e. the damping force of the suspension via the respective actuators 2.

In a modification of the seventeenth preferred embodiment, the harshness components may be derived by filtering signals indicative of elapsed variation rates of the vehicular heights $H_{FL}$ and $H_{FR}$. Further, instead of using the vehicular height sensors, wheel speed sensors, sprung mass acceleration sensors, pressure sensors, load sensors or the like may be used to derive the harshness components. Still further, at the step 308 in FIG. 31, both of the harshness based correction coefficients $K_{XL\ and\ XR}$ and $K_{YL\ and\ YR}$ may be used to derive $DXH_{FL-RR}$ and $DYH_{FL-RR}$. In this case, the vehicle speed based correction coefficient Kv may be used for one of $DXH_{FL-RR}$ and $DYH_{FL-RR}$.

An eighteenth preferred embodiment will be described hereinbelow with respect to only what is modified from the seventeenth preferred embodiment.

Figure 35:
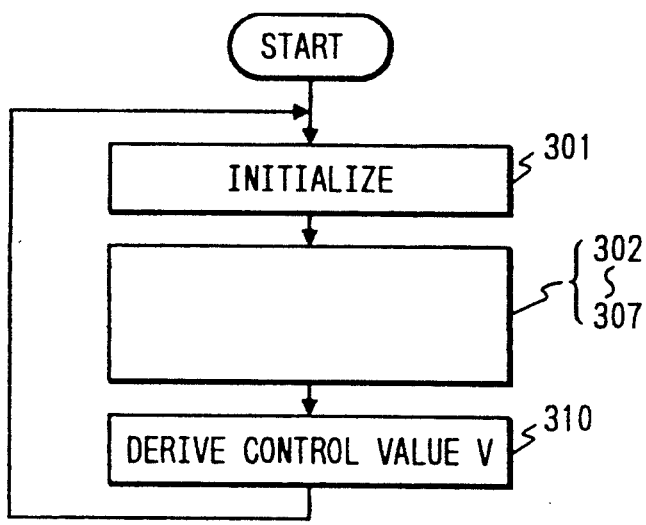
FIG. 35 is a flowchart to be executed by the electronic control unit in FIG. 30 for deriving a damping force control value, according to an eighteenth preferred embodiment.
Figure 36:
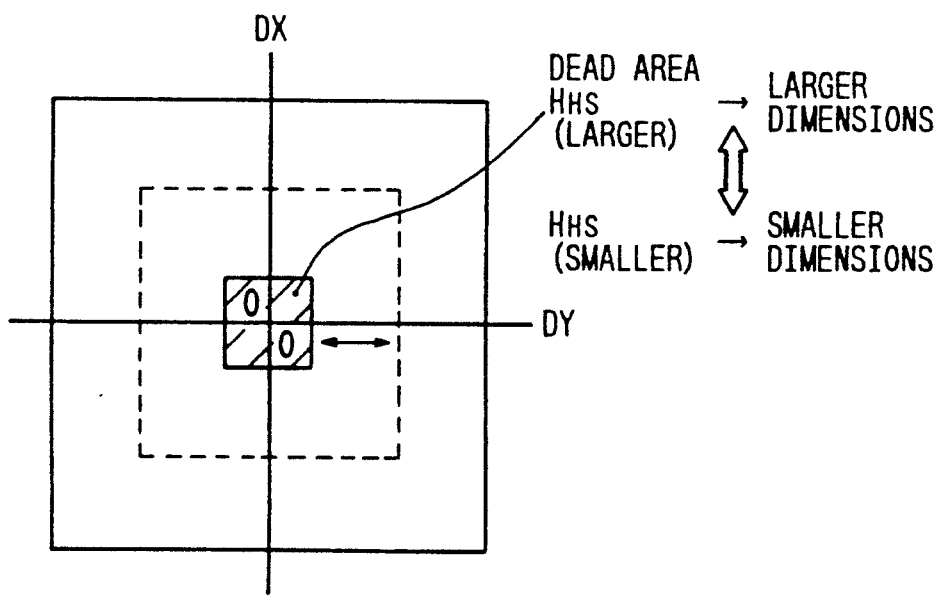
FIG. 36 is a diagram showing a damping force variation dead area relative to a sprung mass velocity and a relative velocity between sprung and unsprung masses.

In the seventeenth preferred embodiment, the sprung mass velocities $DX_{FL-RR}$ and the relative velocities $DY_{FL-RR}$ are corrected depending on magnitudes of the harshness components. In the eighteenth preferred embodiment, as shown in FIG. 35, the step 308 in FIG. 31 is omitted and instead a step 310 executes either of the following processings:

(1) As shown in FIG. 36, dimensions of a dead area are varied depending on magnitudes of the harshness components ($H_{HSFL}$, $H_{HSFR}$). In the dead area, the damping force is fixed to a low level.

Figure 37:
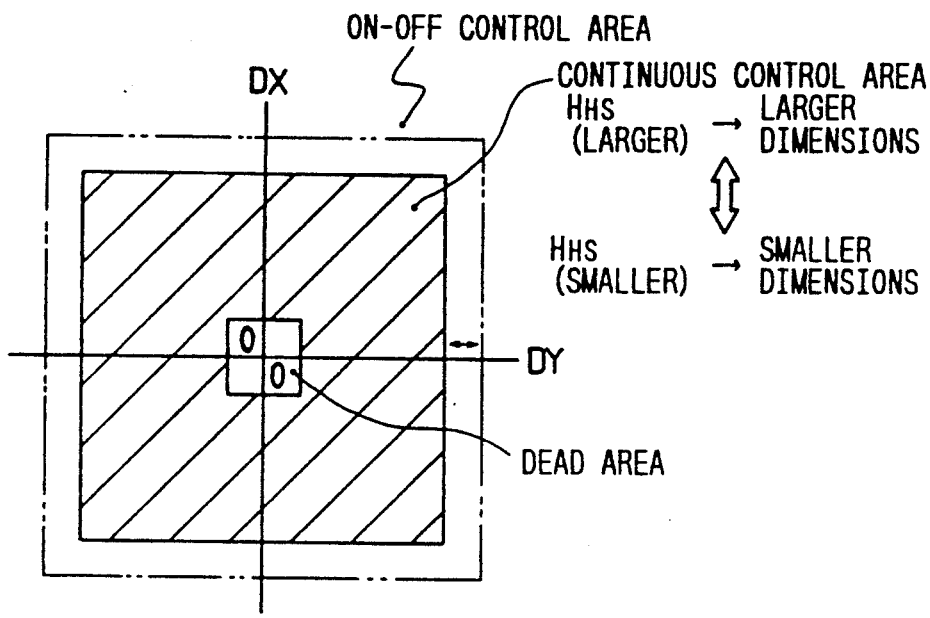
FIG. 37 is a diagram showing a continuous control area relative to the sprung mass velocity and the relative velocity.

(2) As shown in FIG. 37, dimensions of a continuous control area are varied depending on magnitudes of the harshness components. In the continuous control area, the damping force is gradually increased according to magnitudes of the sprung mass velocity DX and the relative velocity DY. However, a gradient of the damping force increase is decreased as the dimensions of the continuous control area are increased.

Figure 38:
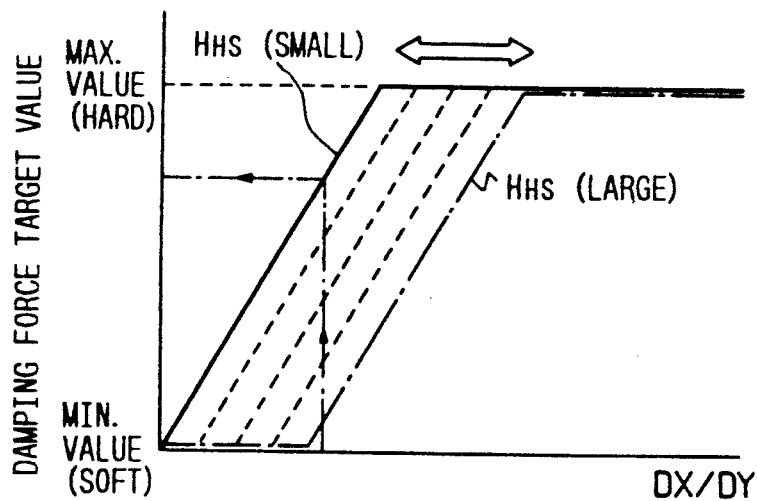
FIG. 38 is a map for deriving a damping force target value.

(3) As shown in FIG. 38, a rising point of a target value of the damping force is varied to a larger quotient (DX/DY) as a magnitude of the harshness component gets larger. This means that the dead area is increased as the harshness component gets larger.

Figure 39:
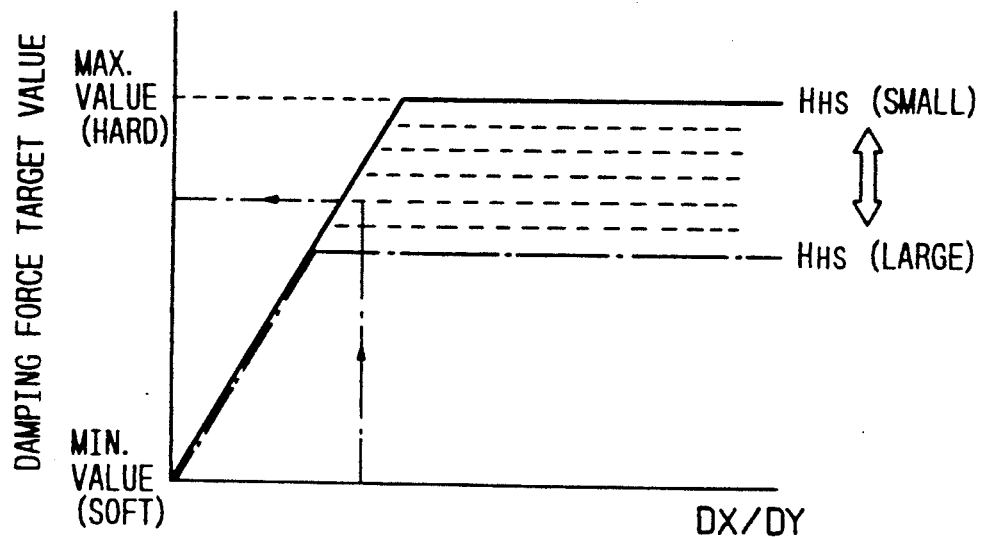
FIG. 39 is a map for deriving a damping force target value.

(4) As shown in FIG. 39, an upper limit of a damping force target value is varied depending on a magnitude of the harshness component.

Figure 40:
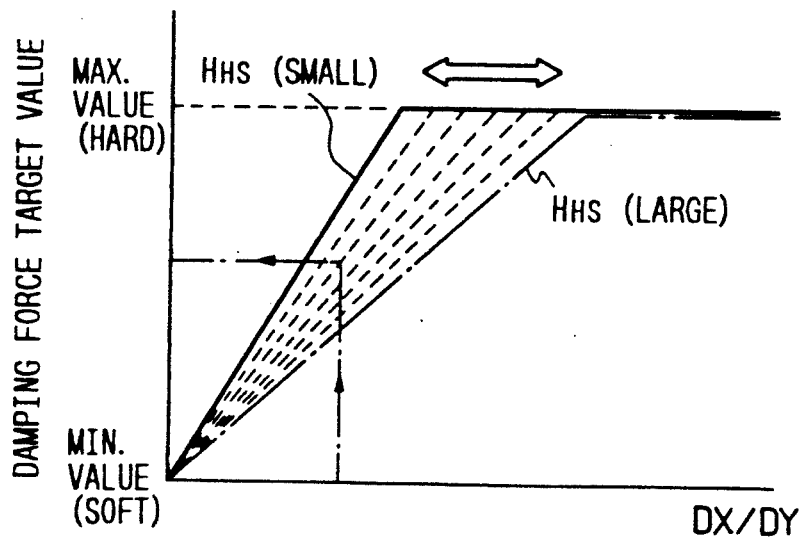
FIG. 40 is a map for deriving a damping force target value.

(5) As shown in FIG. 40, a rising gradient of a damping force target value relative to the quotient (DX/DY) is varied depending on a magnitude of the harshness component.

Figure 41:
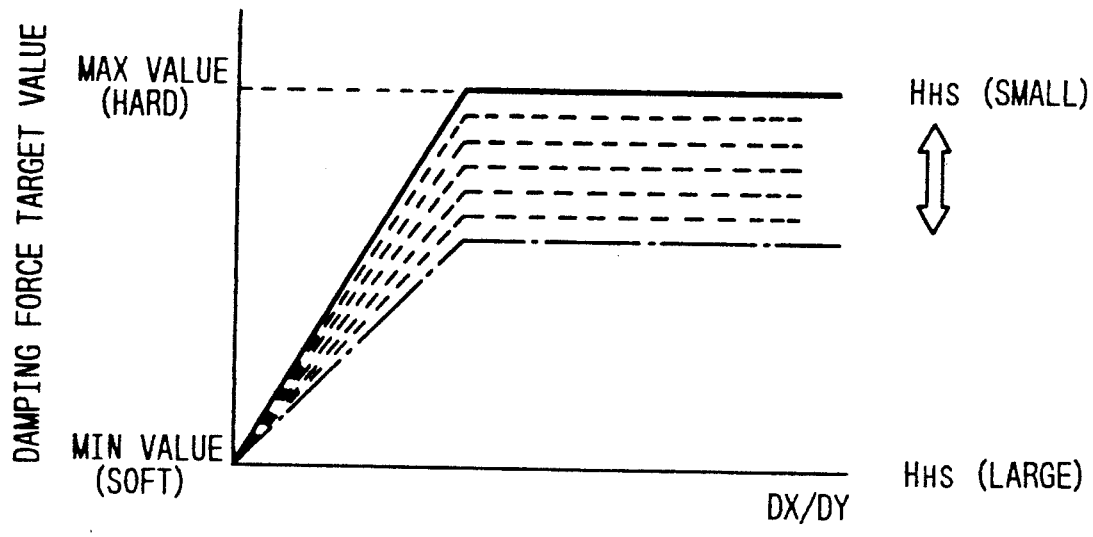
FIG. 41 is a map for deriving a damping force target value.

(6) As shown in FIG. 41, the above-noted processings (4) and (5) are combined.

When the step 310 executes either of the processings (1)–(6), the damping force is controlled depending on the magnitude of the harshness component.

A nineteenth preferred embodiment will be described hereinbelow with respect to only what is modified from the seventeenth preferred embodiment.

Figure 31:
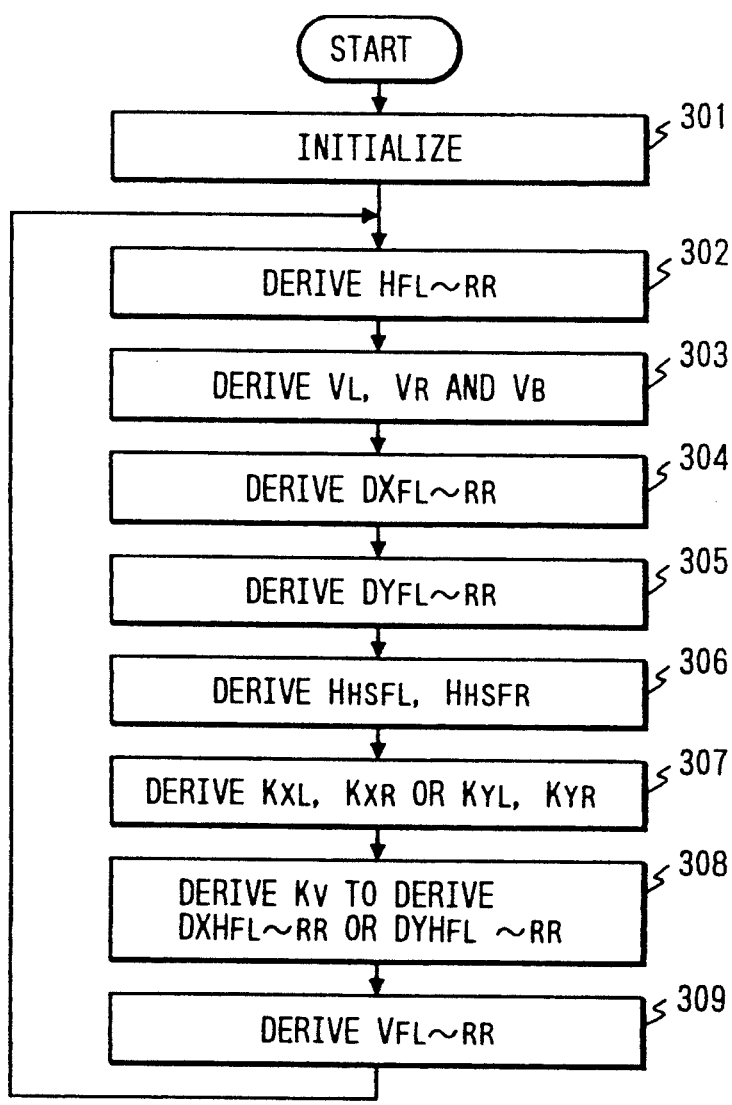
FIG. 31 is a flowchart to be executed by an electronic control unit in FIG. 30 for deriving damping force control values.
Figure 42:
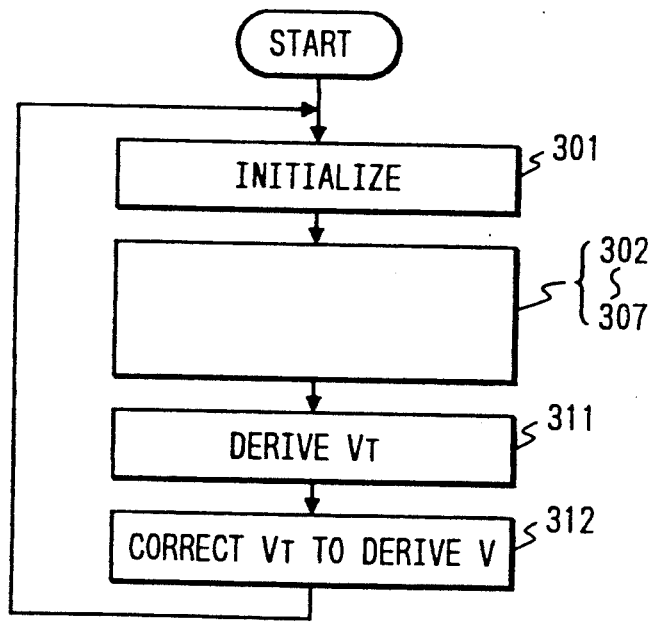
FIG. 42 is a flowchart to be executed by the electronic control unit in FIG. 30 for deriving a damping force control value, according to a nineteenth preferred embodiment.

As shown in FIG. 42, the steps 308 and 309 in FIG. 31 are replaced by steps 311 and 312. At the step 311, a preliminary or tentative command value $V_T$ is derived as at the step 207 in FIG. 16. Subsequently, at the step 312, the derived command value $V_T$ is corrected in the manner as defined by either of the foregoing processings (1) to (6).

It is to be understood that this invention is not to be limited to the preferred embodiments and modifications described above, and that various changes and modifications may be made without departing from the spirit and scope of the invention as defined in the appended claims.

What is claimed is:

1. A damping force control system for a shock absorber for use in a vehicle, comprising:

an actuator for varying a damping force of the shock absorber provided between a sprung mass and an unsprung mass;

first means for detecting at least one of a sprung mass vertical vibration of the sprung mass and a relative vibration between the sprung mass and the unsprung mass;

second means for deriving a sprung mass velocity based on the detection result of the first means, producing a first signal indicative of the derived sprung mass velocity, and defining a sign of the sprung mass velocity based on whether the sprung mass velocity is in an upward direction or a downward direction;

third means for deriving a relative velocity between the sprung mass and the unsprung mass based on the detection result by the first means, producing a second signal indicative of the derived relative velocity, and defining a sign of the relative velocity based on whether the relative velocity is in an expansion direction or a compression direction, wherein the sign of the relative velocity in the expansion direction and the compression direction correspond to the sign of the sprung mass velocity in the upward direction and downward direction, respectively;

fourth means for extracting at least a high-frequency component within a predetermined frequency band from the at least one of the sprung mass vertical vibration and the relative vibration and producing a third signal indicative of the extracted high-frequency component; and fifth means, responsive to the first signal, second signal and third signal, for controlling an operation of the actuator to provide a lower damping force of the shock absorber when the sign of the sprung mass velocity and the sign of the relative velocity are different from each other, to provide a higher damping force of the shock absorber when the sign of the sprung mass velocity and the sign of the relative velocity are the same, and to reduce a degree of the higher damping force in accordance with a magnitude of the high-frequency component when the sign of the sprung mass velocity and the sign of the relative velocity are the same.

2. A damping force control system according to claim 1, wherein the sprung mass represents a vehicle body and the unsprung mass represents a vehicular wheel.

3. A damping force control system according to claim 2, wherein the fourth means further extracts a low-frequency component within a predetermined frequency band from the at least one of the sprung mass vertical vibration and the relative vibration.

4. A damping force control system according to claim 3, wherein the fifth means controls the damping force of the shock absorber by using a first correction index indicative of a magnitude of the low-frequency component and a second correction index indicative of a magnitude of the high-frequency component.

5. A damping force control system according to claim 4, wherein the fifth means derives a feeling-based correction value based on the first correction index and the second correction index so as to correct the at least one of the sprung mass velocity and the relative velocity.

6. A damping force control system according to claim 3, wherein the fifth means controls the operation of the actuator so that a lower damping force is provided as a ratio of the high-frequency component to the low-frequency component increases.

7. A damping force control system according to claim 3, wherein the fifth means sets an upper limit value of the damping force based on the high-frequency component and the low-frequency component.

8. A damping force control system according to claim 7, wherein the fifth means sets the upper limit value to be lower as a magnitude of a ratio of the high-frequency component to the low-frequency component increases.

9. A damping force control system according to claim 3, wherein the fifth means sets a lower limit value of the damping force based on the high-frequency component and the low-frequency component.

10. A damping force control system according to claim 3, wherein the fourth means extracts the high-frequency component based on a signal indicative of a sprung mass acceleration and extracts the low-frequency component based on a signal indicative of an integrated value of the sprung mass acceleration.

11. A damping force control system according to claim 3, wherein the fourth means extracts at least one of the high-frequency component and the low-frequency component based on a signal indicative of a relative displacement between the sprung mass and the unsprung mass.

12. A damping force control system according to claim 3, wherein the fourth means extracts at least one of the high-frequency component and the low-frequency component based on a signal indicative of a vehicular wheel speed.

13. A damping force control system according to claim 2, wherein the fifth means controls the operation of the actuator to correct the damping force based on a magnitude of a monitored vehicle speed.

14. A damping force control system according to claim 2, wherein the fifth means varies dimensions of a dead area where the damping force is set low, based on a magnitude of the high-frequency component.

15. A damping force control system according to claim 14, wherein the high-frequency component is a harshness component within a frequency band of 10 Hz to 30 Hz.

16. A damping force control system according to claim 2, wherein the fifth means derives a correction value based on a magnitude of the high-frequency component so as to correct the at least one of the sprung mass velocity and the relative velocity.

17. A damping force control system according to claim 2, wherein the fifth means varies an upper limit value of the damping force in accordance with a magnitude of the high-frequency component.

18. A damping force control system according to claim 2, wherein the fifth means varies a gradient of a damping force variation relative to a ratio between the sprung mass velocity and the relative velocity, in accordance with a magnitude of the high-frequency component.

19. A damping force control system according to claim 2, wherein the fourth means extracts the high-frequency component based on a vehicular height indicative signal.

20. A damping force control system for a shock absorber for use in a vehicle, comprising:

an actuator for varying a damping force of the shock absorber provided between a sprung mass and an unsprung mass;

first means for detecting a sprung mass acceleration and deriving a sprung mass velocity from the sprung mass acceleration, producing a first signal indicative of the derived sprung mass velocity, and defining a sign of the sprung mass velocity based on whether the sprung mass velocity is in an upward direction or a downward direction;

second means for deriving a relative velocity between the sprung mass and the unsprung mass, producing a second signal indicative of the derived relative velocity, and defining a sign of the relative velocity based on whether the relative velocity is in an expansion direction or a compression direction, wherein the sign of the relative velocity in the expansion direction and the compression direction correspond to the sign of the sprung mass velocity in the upward direction and downward direction respectively;

third means for extracting at least a high-frequency component within a predetermined frequency band from the sprung mass acceleration and producing a third signal indicative of the extracted high-frequency component; and fourth means, responsive to the first signal, second signal and third signal, for controlling an operation of the actuator to provide a lower damping force of the shock absorber when sign of the sprung mass velocity is different from the sign of relative velocity and to provide a higher damping force of the shock absorber when the sign of the sprung mass velocity is the same as the sign of the relative velocity, and to reduce a degree of the higher damping force in accordance with a magnitude of the high-frequency component.

21. A damping force control system according to claim 20, wherein the fourth means further extracts a low-frequency component within a predetermined frequency band from the sprung mass acceleration.

* * * * *